(12) United States Patent
Takeda

(10) Patent No.: US 8,384,334 B2
(45) Date of Patent: Feb. 26, 2013

(54) NORMAL-CONDITION-OFF-TYPE PROTECTION ELEMENT AND CONTROL UNIT HAVING THE NORMAL-CONDITION-OFF-TYPE PROTECTION ELEMENT

(75) Inventor: Hideaki Takeda, Misato (JP)

(73) Assignee: Uchiya Thermostat Co., Ltd. (JP)

( * ) Notice: Subject to any disclaimer, the term of this patent is extended or adjusted under 35 U.S.C. 154(b) by 95 days.

(21) Appl. No.: 13/063,913

(22) PCT Filed: Jul. 9, 2009

(86) PCT No.: PCT/JP2009/003214
§ 371 (c)(1),
(2), (4) Date: Mar. 14, 2011

(87) PCT Pub. No.: WO2010/038339
PCT Pub. Date: Apr. 8, 2010

(65) Prior Publication Data
US 2011/0164340 A1    Jul. 7, 2011

(30) Foreign Application Priority Data

Sep. 30, 2008   (JP) ................. 2008-254976

(51) Int. Cl.
*H02H 5/04* (2006.01)
(52) U.S. Cl. .................. 318/783; 318/400.22
(58) Field of Classification Search .......... 318/370, 318/371, 375, 400.22, 400.21
See application file for complete search history.

(56) References Cited

U.S. PATENT DOCUMENTS

| | | | | |
|---|---|---|---|---|
| 5,381,296 | A * | 1/1995 | Ekelund et al. | 361/106 |
| 7,206,176 | B2 * | 4/2007 | Bielesch | 361/26 |
| 7,206,178 | B2 * | 4/2007 | Friedrichs et al. | 361/93.1 |
| 2006/0087774 | A1 * | 4/2006 | Bielesch | 361/23 |

FOREIGN PATENT DOCUMENTS

| | | |
|---|---|---|
| DE | 3932272 A1 | 3/1990 |
| GB | 2223636 A | 4/1990 |
| JP | 54-124974 U | 8/1979 |
| JP | 59-185938 U | 12/1984 |
| JP | 2003-199247 A | 7/2003 |
| JP | 2006-158145 A | 6/2006 |
| JP | 2006-291908 A | 10/2006 |
| JP | 2007-28736 A | 2/2007 |

OTHER PUBLICATIONS

"International Application Serial No. PCT/JP2009/003214, International Search Report mailed Sep. 15, 2009", (w/ English Translation), 5 pgs.
"German Patent Application Serial No. 112009002254.5, Office Action dated Oct. 17, 2012", (w/ English Translation), 10 pgs.
"International Application Serial No. PCT/JP2009/003214, International Preliminary Report On Patentability issued May 10, 2011", (w/English Translation), 9 pgs.
"International Application Serial No. PCT/JP2009/003214, International Search Report mailed Sep. 15, 2009", (w/English Translation), 5 pgs.
"International Application Serial No. PCT/JP2009/003214, Written Opinion mailed Sep. 15, 2009", (w/ English Translation), 7 pgs.

* cited by examiner

*Primary Examiner* — Walter Benson
*Assistant Examiner* — Iftekhar Mustafa
(74) *Attorney, Agent, or Firm* — Schwegman Lundberg & Woessner, P.A.

(57) ABSTRACT

A first terminal of a protection element of a control unit is connected to a wire between a motor and a switching element, and a second terminal is directly connected to a ground-side wire shared by a controller and the switching element. The protection element has a normal-condition-OFF-type switch including a movable contact and a fixed contact. When an overheating caused by the switching element attains a predetermined temperature or higher, the movable contact and the fixed contact are closed to short-circuit the first terminal and the second terminal, and an electric current is branched to the protection element side to reduce an electric current flowing into the switching element, and the control unit is shifted to a temperature range safe from the overheating caused by the switching element without stopping a cooling system.

17 Claims, 15 Drawing Sheets

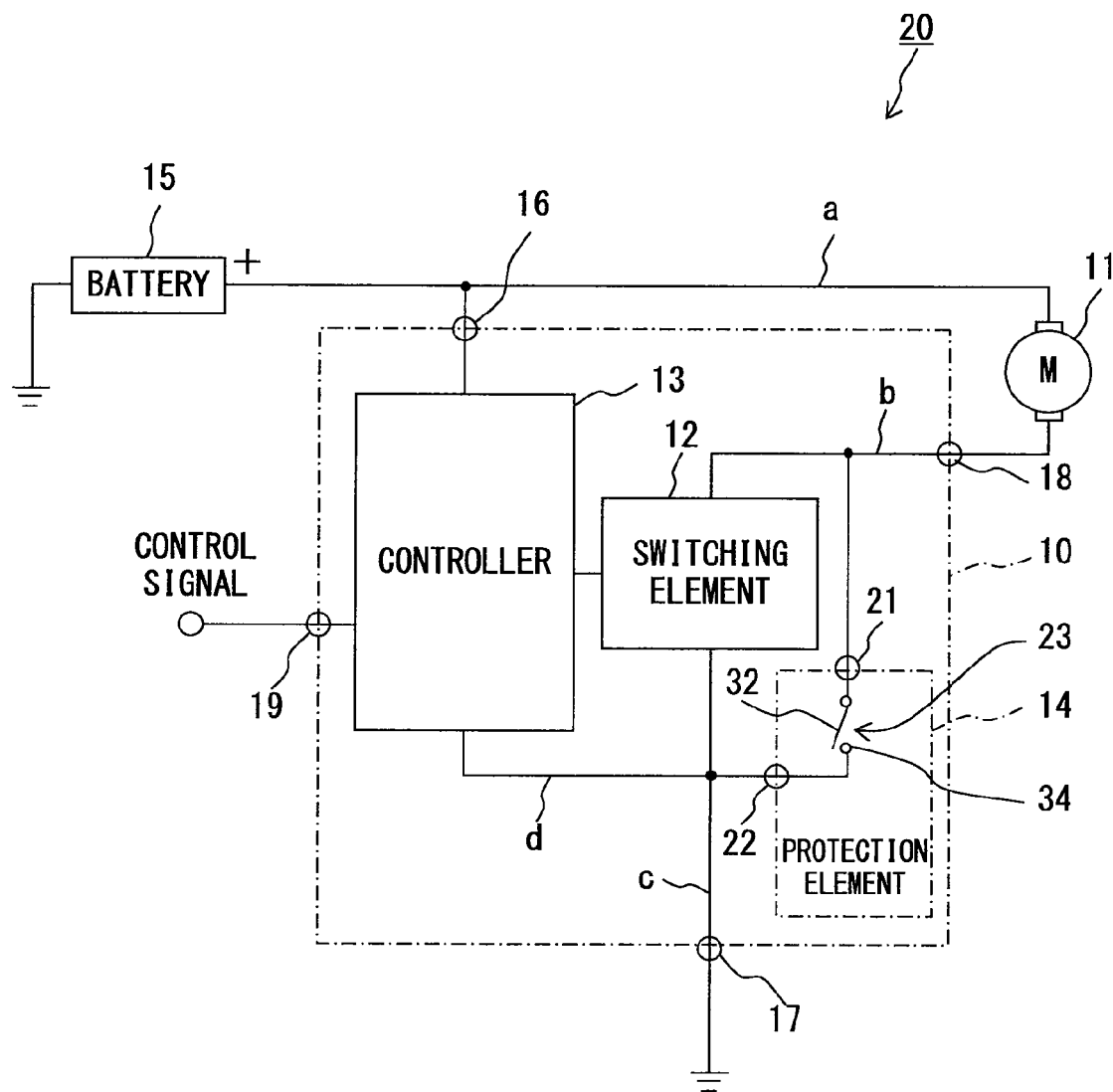
F I G. 1

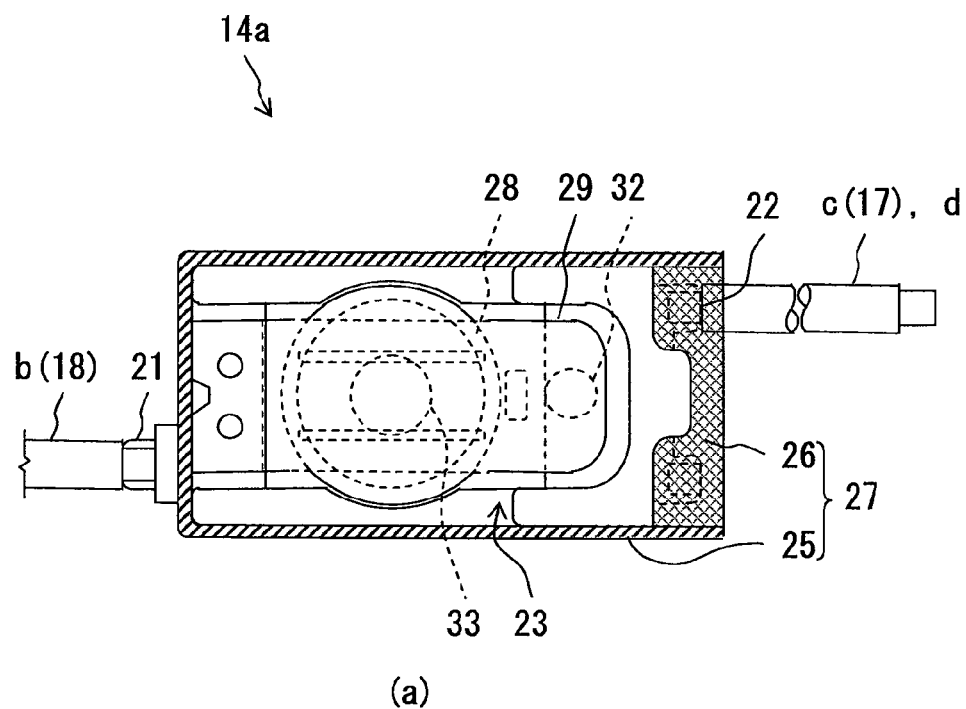
(a)
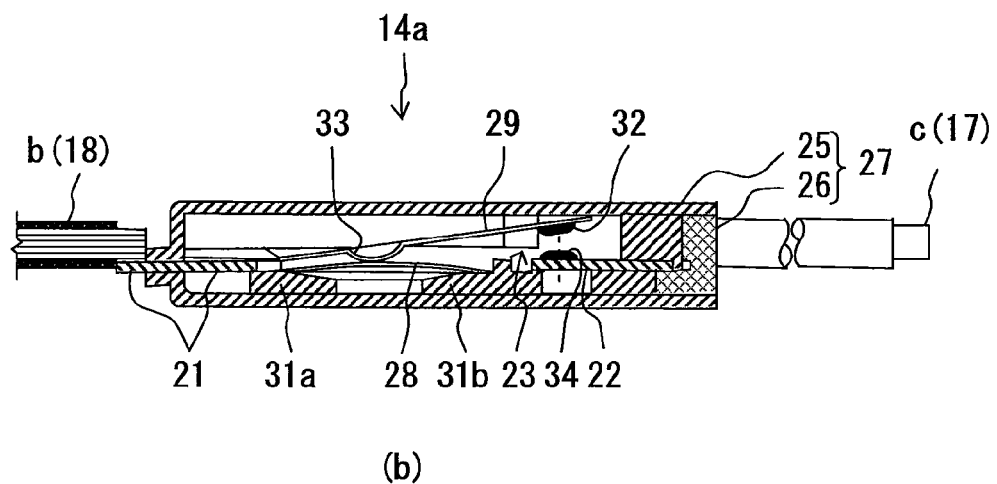
(b)
FIG. 2

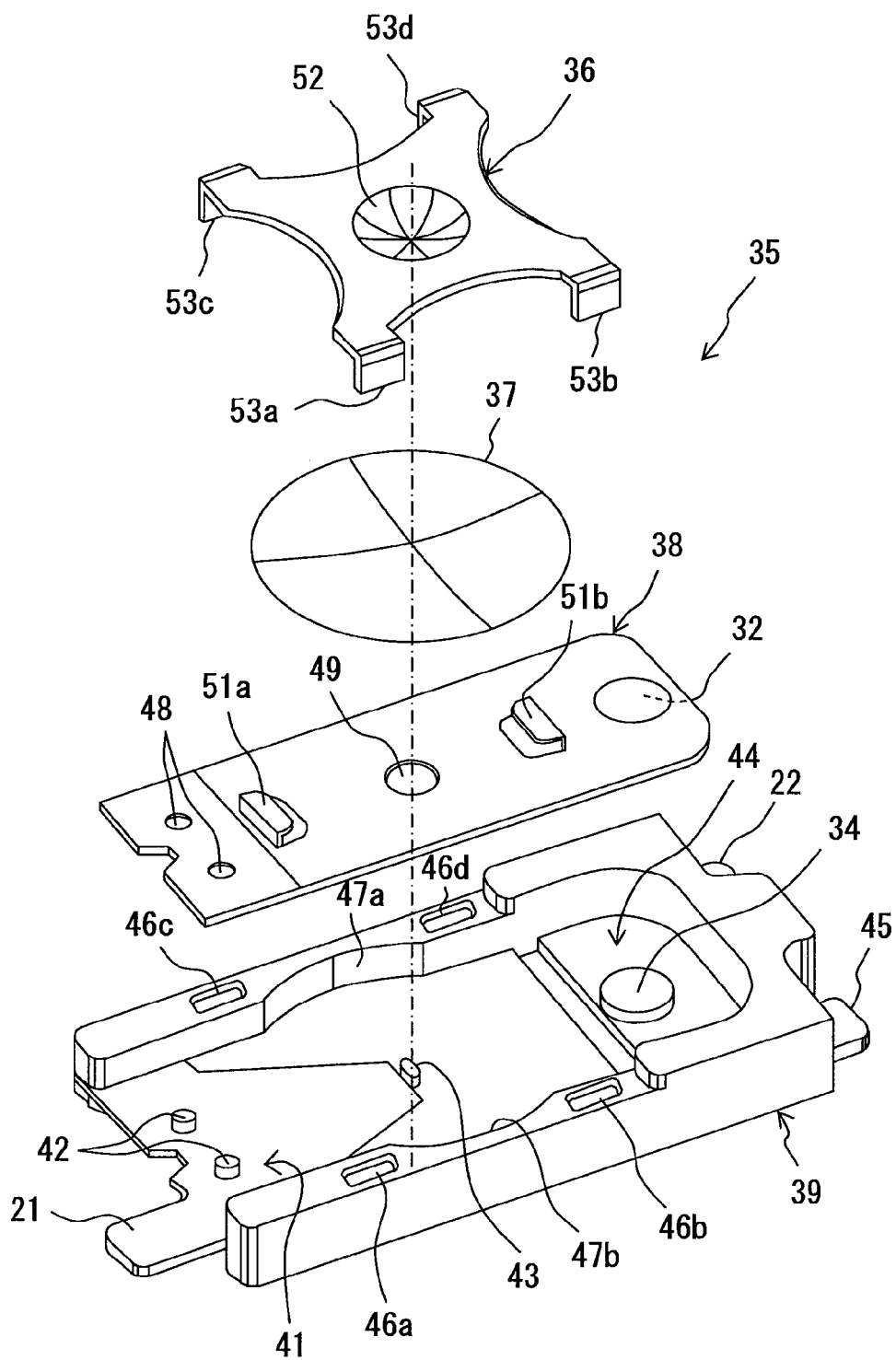
F I G. 4

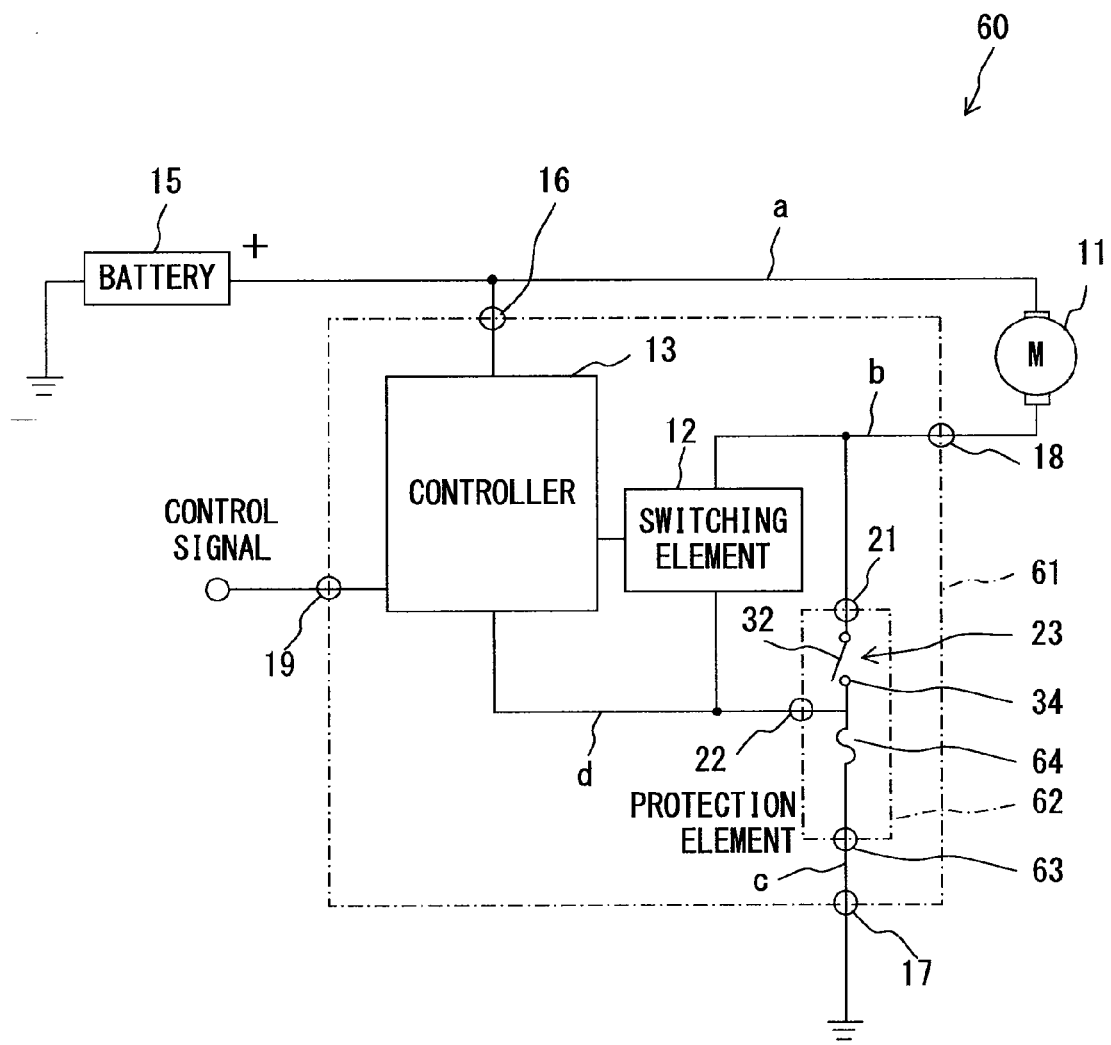
F I G. 7

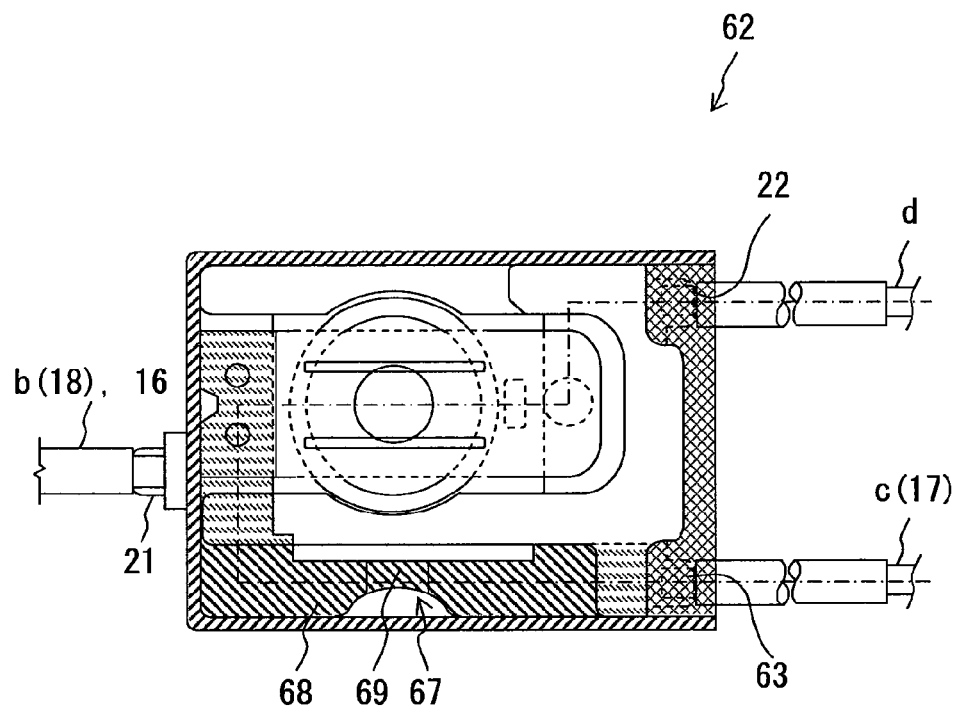
(a)
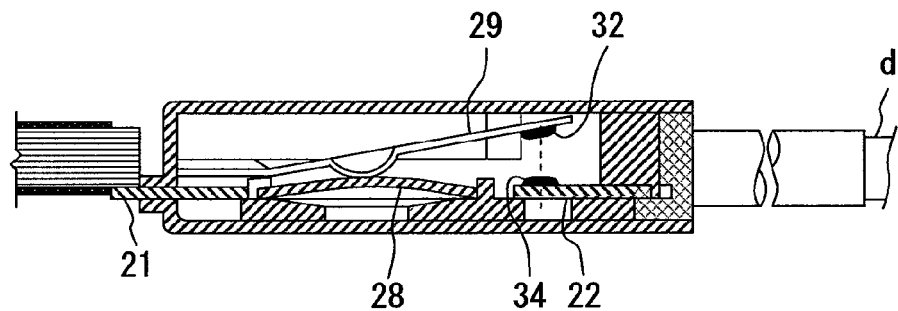
(b)
F I G. 9

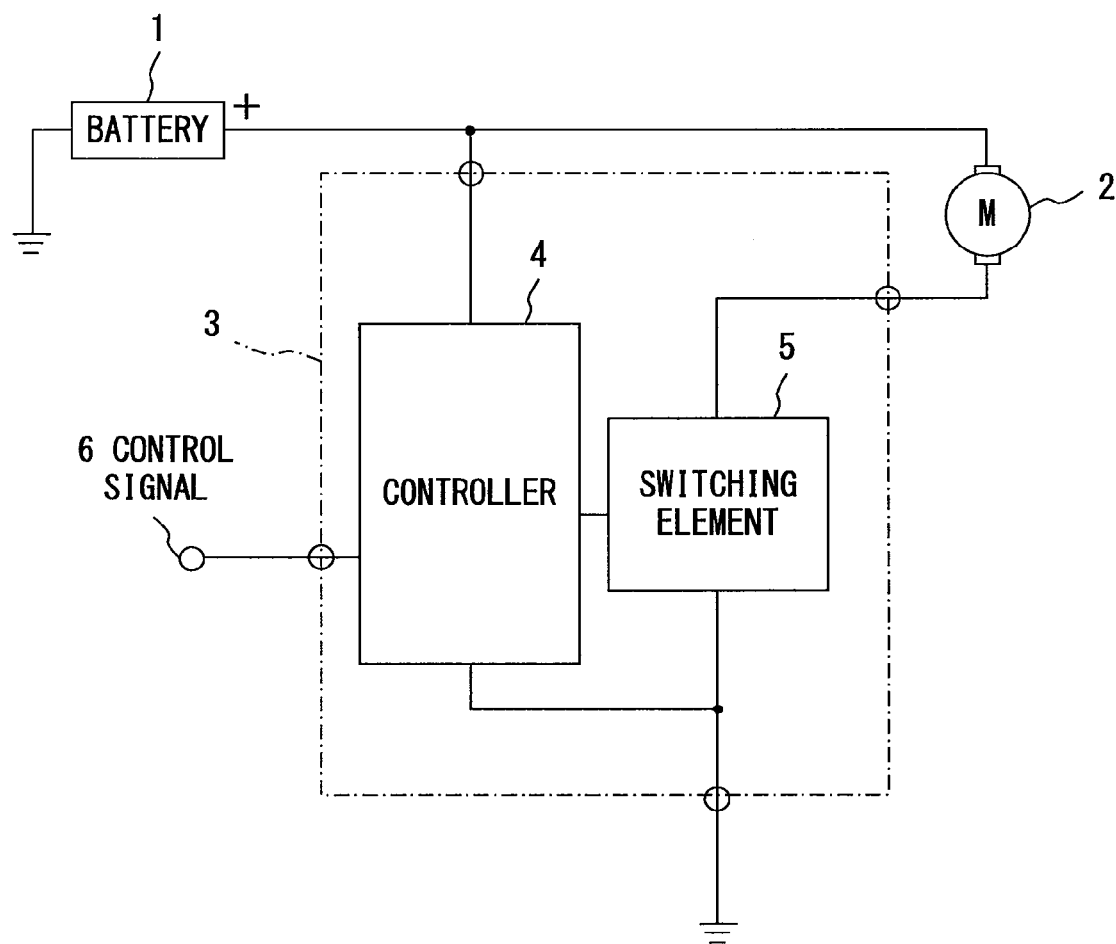
F I G. 10

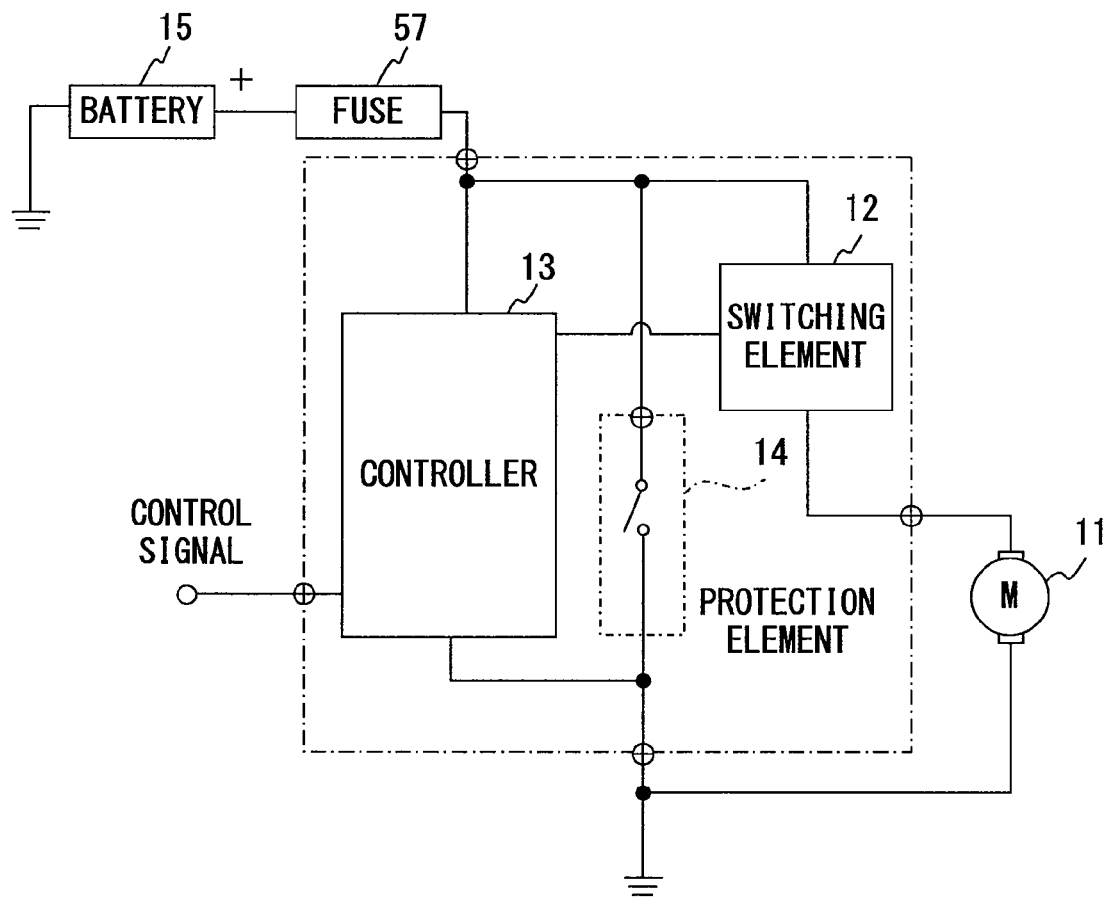
F I G. 1 2

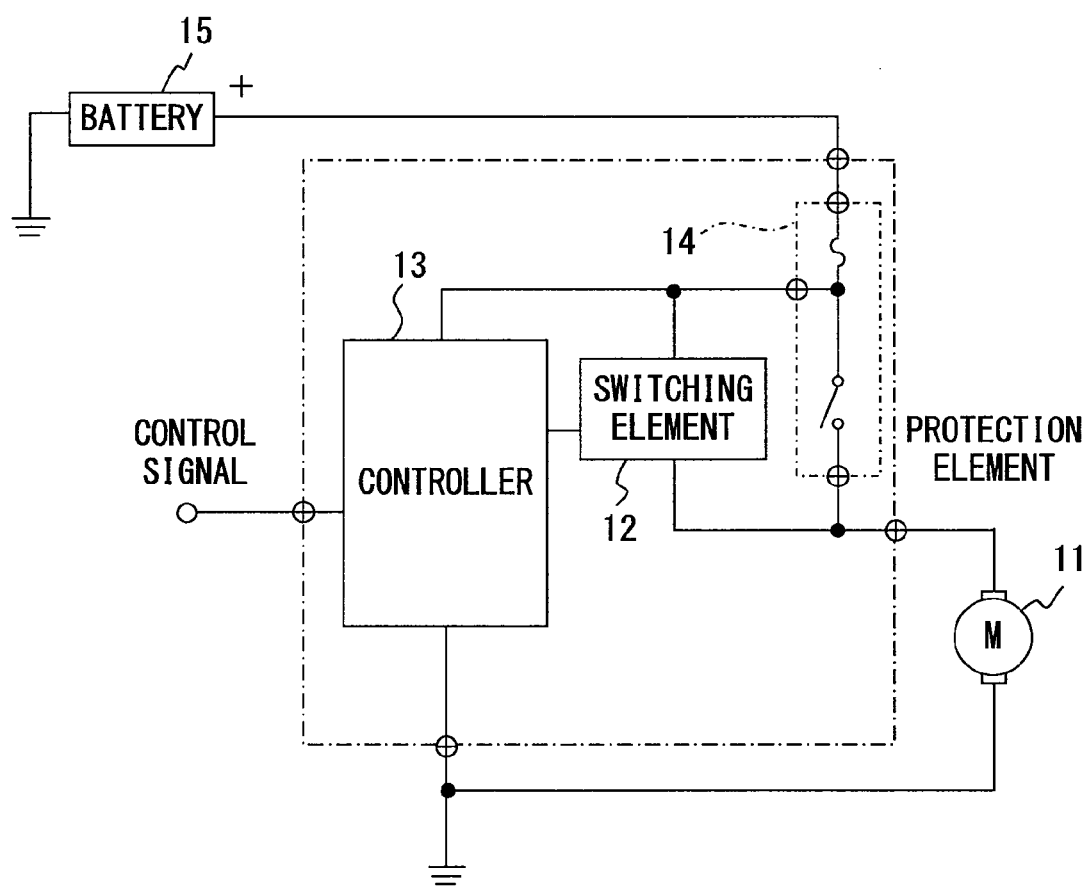
F I G. 1 4

NORMAL-CONDITION-OFF-TYPE PROTECTION ELEMENT AND CONTROL UNIT HAVING THE NORMAL-CONDITION-OFF-TYPE PROTECTION ELEMENT

RELATED APPLICATIONS

This application is a U.S. National Stage Filing under 35 U.S.C. 371 from International Application No. PCT/JP2009/003214, filed on Jul. 9, 2009, and published as WO 2010/038339 A1 on Apr. 8, 2010, which claimed priority under U.S.C. 119 to Japanese Application No. 2008-254976, filed Sep. 30, 2008, which applications and publication are incorporated herein by reference in their entirety.

TECHNICAL FIELD

The present invention relates to a control unit having a normal-condition-OFF-type protection element that is an OFF type under normal conditions, and protects a circuit to be protected from being damaged due to overheating via branching of an electric current of the circuit to be protected by closing contacts at an anomalous temperature.

BACKGROUND ART

Conventionally, a cooling process executed by a cooling system using a cooling medium of an air-conditioner or by a cooling system of a gasoline engine of an automobile, particularly a large automobile, is executed by using a heat exchanger, which is forcibly cooled down by revolving a fan if necessary.

The driving control of a motor for revolving a fan blade is performed with a simple control method for turning on/off a driving circuit of the motor on the basis of a temperature detection signal from a temperature sensor (a water temperature sensor or the like in the case of a gasoline engine) of a heat exchanger.

If the motor being used is a brush motor, a controller of a fan motor can control the number of revolutions with an effective voltage. In this case, pulse width modulation (PWM) control using a semiconductor is used. With the pulse width modulation (PWM) control, the number of revolutions of a fan motor can be smoothly controlled by varying a time width (duty ratio) of ON to OFF.

For such a control, a control unit is used. The control unit side has a protection function for decreasing an electric current to a safe range as a protection operation performed when, for example, a temperature within the unit is high or an anomalous current flows, due for example to locking of a fan motor, in addition to controlling the number of revolutions of the fan motor according to a temperature of a cooling medium of a heat exchanger.

Incidentally, with improvements in fuel efficiency in automobiles, engines have been increasing in power consumption as well as in size. As the power consumption increases, current becomes higher. This can pose a more serious problem when a fault occurs than conventional engines. Accordingly, system protection priority control such as multi-step control, more precise revolution speed control, or the like has been performed in recent years in order to perform a more precise revolution control of an engine.

With such a system protection priority control, when for example a temperature sensor arranged in an engine cooling system detects an anomaly, an electric fan control device for cooling down an engine ignores control performed for an electric motor according to another control, and continues to cool down the engine by driving the electric motor with a maximum number of revolutions, or continues to drive the electric motor with a controlled number of revolutions corresponding to normal conditions where a temperature detected by the temperature sensor is low (for example, see Patent Document 1).

FIG. 10 is a block diagram simply illustrating a configuration of such an electric fan control device for cooling down an engine. As illustrated in this figure, an electric current of a power supply battery 1 is supplied to a motor 2 for revolving and driving the engine cooling fan, not illustrated, and to a motor control device 3 (engine cooling electric fan control device) for controlling the number of revolutions of the motor 2.

The motor control device 3 has a controller 4 and a switching element 5. The controller 4 causes the motor 2 to revolve at a predetermined temperature or higher on the basis of an externally input control signal 6 (such as a temperature detection signal from a temperature sensor arranged in a heat exchanger of an engine cooling system, or information from another control unit), and outputs a PWM (Pulse Width Modulation) control signal for controlling the number of revolutions of the motor 2 according to a temperature.

The switching element 5 has a continuously closed contact part and a pulse control unit. The switching element 5 has a function for controlling the number of revolutions of the motor 2 by turning on/off a current on the basis of the control signal from the above described controller 4, and for decreasing the temperature of a cooling medium of the heat exchanger by revolving a fan, not illustrated.

Additionally, the electric motor is driven with a controlled number of revolutions, corresponding to a case where a detected temperature of the temperature sensor is low according to the control of the controller 4. Cooling of the engine by driving the electric motor with a maximum number of revolutions while ignorant of a control performed by another device for the electric motor can be easily maintained by shorting the circuits of the positive and negative poles within the switching element 5.

PRIOR ART DOCUMENT

Patent Document 1: Japanese Laid-open Patent Publication No. 2006-291908

DISCLOSURE OF INVENTION

Problems to be Solved by the Invention

If the motor 2 for revolving and driving the engine cooling fan is a brush motor, pulse width modulation (PWM) control is the main type of motor driving control performed by the switching element 5 of the motor control device 3. Safety measures for the engine cooling fan and its vicinity have only been safety measures taken by the control of the switching element 5 on the motor control device 3 side.

Normally, a device such as the motor control device 3 has a protection switch, and ensures the safety of the device by interrupting an electric current flowing into the circuit with the use of the protection switch when an anomaly occurs. However, for a protection switch activated by temperature, a current to be interrupted flows into the protection switch under normal conditions. Therefore, Joule heat is caused by resistance within the protection switch.

This causes a phenomenon wherein an environmental activation temperature T2 at which the protection switch is actually activated does not become "T2=T1", in contrast to an operation temperature T1 inherent in the protection switch itself, the environmental activation temperature T2 at which the protection switch is actually activated results in "T2=T3+T4" being obtained by adding a temperature T4 due to the above caused Joule heat to a current temperature T3 (T3<T1) of the protection switch, and the actual activation temperature becomes lower than the environmental operation temperature T2 (=T1) set in the system.

Additionally, the motor control device operates in an environment where an internal temperature rises to as high as 150° C., the motor control device is used within an engine room having a high temperature, the motor control device is directly influenced by heat produced by the motor within a body that is almost integrated with the motor and is external to the motor, and a current handled by the motor control device itself is high.

Due to these reasons, if a high current is attempted to be sent to the cooling fan motor, it becomes necessary to set the operation temperature of the switching element to 250° C. or higher even if a temperature increased by Joule heat can be suppressed to 100° C. at 50 A.

Additionally, in consideration of the entire motor control device, if a protection circuit of a normal-condition-engergization/anomalous-condition-interrupt-type protection circuit is installed as a protection switch at the time of an anomaly, extra internal resistance increases on an engergization path, leading to promoting of a temperature increase of the motor control device.

Furthermore, heat produced by a contact part is transferred as a temperature to the protection switch even with slight fluctuations in contact resistance between contacts of the switching element, and the protection switch is activated even though the environmental temperature is within a normal range.

As a motor control device, a mechanical contact needs to exist on an energization path such as the protection switch in consideration of final safety. However, in consideration of reliability as a motor control device, the mechanical contact cannot be easily embedded, which is a problem.

If an applied current is high as described above, the temperature at which the protection switch is activated tends to rise even within a low current range. Therefore, stable operations are difficult in a heat responsive type protection switch such as a bimetal having an operation temperature susceptible to the influences of a current.

Additionally, the temperature within the motor control device anomalously rises in some cases due to a fault or the like in a semiconductor that configures a controller or a switching element. Normally, however, the system protection priority control is a control performed for a cooling fan motor, and the protection of a circuit within the motor control device where a temperature anomalously rises as described above is not taken into account.

Furthermore, the size of motors has tended to increase in recent years in order to support a high current, as described above. A brushless type motor is used in many cases as a motor that supports such a high current. Moreover, a three-phase inverter circuit is needed to drive the brushless motor.

However, with the three-phase inverter, a protection operation performed by a short-circuiting of the switching element cannot be set. Accordingly, it is difficult to embed the brushless motor in a control system that gives precedence to system protection.

Means for Solving the Problems

An object of the present invention is to provide a normal-condition-OFF-type protection element that can protect a circuit to be protected including a driving circuit of a cooling fan motor from being damaged due to overheating without influencing an operation temperature even at a high current, and can shift to a safe temperature range, and to provide a control unit having the normal-condition-OFF-type protection element.

Initially, a control unit having a normal-condition-OFF-type protection element according to a first invention is a control unit for controlling driving of a motor that revolves and drives a heat exchanger cooling fan of a cooling system using a cooling medium and a heat exchanger. The control unit includes at least a switching element for controlling the driving of the motor, and a controller for transmitting a control signal to the switching element. The control unit comprises: a normal-condition-OFF-type protection element having a first terminal connected to on of wires connected to the positive and negative poles connected to the motor, and a second terminal directly connected to a ground wire without being connected to the other of the wires connected to the positive and the negative poles; and short-circuit means, arranged inside the normal-condition-OFF-type protection element, for short-circuiting the first terminal and the second terminal when an overheating caused by the switching element attains a predetermined temperature or higher. In the control unit, the short-circuit means short-circuits the first terminal and the second terminal when the overheating caused by the switching element attains the predetermined temperature or higher, whereby an electric current flowing into the switching element is decreased, and the control unit is shifted to a temperature range safe from the overheating caused by the switching element without stopping the cooling system.

In this control unit, for example, the first terminal is connected to a load-side wire of the switching element, and the second terminal is connected to a ground-side wire of the switching element.

Additionally, the short-circuit means comprises, for example, a heat responsive element that inverts a warp direction at a predetermined temperature or higher, and an energization elastic member that separates a movable contact, provided on a free end side, from a fixed contact, fixedly arranged within a housing of a body device of the normal-condition-OFF-type protection element, according to an inversion operation of the heat responsive element. The first terminal is a terminal linked to the movable contact, the second terminal is a terminal linked to the fixed contact, and the heat responsive element exerts force on the movable contact and moves it to a position separate from the fixed contact via the energization elastic member by using a warp shape at a normal temperature in a normal temperature range, and the heat responsive element cancels the force on the energization elastic member by inverting the warp shape at an anomalous temperature or higher to make the movable contact touch the fixed contact via the elasticity of the energization elastic member.

Furthermore, the short-circuit means comprises, for example, a heat responsive element that inverts a warp direction at a predetermined temperature or higher; an energization elastic member that engages with both ends of the heat responsive element, warps according to an inversion operation of the heat responsive element, and has one end fixed inside the housing of the body device of the normal-condition-OFF-type protection element in order to be connected to the one wire and the other end provided with the movable contact; and a fixing member almost touching the center of a convex part that becomes convex by warping with an inversion of the heat responsive element when the heat responsive element inverts the warp direction at a predetermined temperature or higher. In this control unit, the heat responsive element exerts a force on the movable contact to move it to a position separate from the fixed contact via the energization elastic member according to the warp shape at the normal temperature in the normal temperature range, the heat responsive element causes the movable contact to touch the fixed contact by exerting force on the energization elastic member in a direction opposite to a direction force is exerted at the normal temperature by inverting the warp shape at an anomalous temperature or higher, and the heat responsive element further warps due to the inversion according to an increase in a temperature of the energization elastic member, exerts additional force on the energization elastic member with the warp by using a point touching the fixing member as a fulcrum point, and exerts an additional force causing, via the movable contact, the fixed contact to touch the energization elastic member.

Still further, in the control unit having the normal-condition-OFF-type protection element, the first terminal is connected to a positive pole side of the wires of the positive and the negative poles, the short-circuit means internally short-circuits the first terminal and the second terminal to activate an overcurrent interrupt element provided externally to the control unit, and stops the cooling system when an overheating caused by an anomaly in an internal element of the control unit occurs.

Still further, the first terminal is, for example, connected to the positive pole side of the wires of the positive and the negative poles, the second terminal is connected to the ground wire via the overcurrent interrupt element provided within the control unit, and the short-circuit means internally short-circuits the first terminal and the second terminal to activate the overcurrent interrupt element, and stops the cooling system, when an overheating caused by the anomaly in the internal element of the control unit occurs.

Still further, the switching element may for example comprise an FET (Field Effect Transistor), the first terminal may be a drain terminal, and the second terminal may be a source terminal.

Still further, it is preferable that for example the control unit be a control unit to which an electric current of 25 A or higher is sent, and an internal resistance of the normal-condition-OFF-type protection element at the time of ON is one half or less of an internal resistance of the control unit or the switching element.

A control unit having a normal-condition-OFF-type protection element according to a second invention is a control unit for controlling driving of a motor that revolves and drives a heat exchanger cooling fan of a cooling system. The control unit includes at least a switching element for controlling the driving of the motor, and a controller for transmitting a control signal to the switching element. The control unit comprises: a protection element having a first terminal connected to one of two contacts that are open under normal conditions, and having a wire connecting the motor and the switching element; a second terminal connected to the other of the contacts and a ground-side wire of the switching element and the controller; and a third terminal connected to the second terminal and a ground terminal of the control unit via an overcurrent interrupt element. In the control unit, when overheating caused by an anomaly in an internal element occurs, the overheating of the control unit is suppressed by decreasing an electric current flowing into the switching element by short-circuiting between the first terminal and the second terminal, and if a tolerance value is exceeded by heat produced by the electric current, the protection element causes an interruption between the second terminal and the third terminal to interrupt the control unit from a power supply, and shifts the control unit to a safe temperature range.

In the control unit having the normal-condition-OFF-type protection element, the first terminal is for example connected to a positive pole side wire of the controller, the protection element causes a short-circuit between the first terminal and the second terminal to decrease an electric current flowing into the controller and the switching element, and suppresses the overheating of the control unit when the overheating caused by the anomaly in the internal element occurs, and the protection element causes an interruption between the second terminal and the third terminal to interrupt the control unit from the power supply, and shifts the control unit to the safe temperature range if a tolerance value is exceeded by heat produced by an electric current.

A normal-condition-OFF-type protection element according to a third invention is a normal-condition-OFF-type protection element recognizing a control circuit for driving and controlling an external circuit as a circuit to be protected. The normal-condition-OFF-type protection element comprises: a first terminal, connected to one of the contacts within the element, extending externally to the element in order to be connected to one of the wires connected to the positive and negative poles of the circuit to be protected; a second terminal, connected to the other of the contacts within the element, extending externally to the element in order to be connected to the other of the wires connected to the positive and the negative poles; a third terminal to be connected to a ground wire externally to the element; and a temperature fuse, arranged between the second terminal and the third terminal, melting at a predetermined temperature or higher. The normal-condition-OFF-type protection element becomes a normal-condition-OFF-type by opening the contacts under normal conditions, and protects the circuit to be protected from being damaged due to overheating by using a branch of an electric current of the circuit to be protected between the first contact and the second contact by closing the contacts at an anomalous temperature, and the temperature fuse melts to interrupt a current path between the first and the second contacts and the third contact if the anomalous temperature further rises to the predetermined temperature or higher, so that the electric currents of the circuit to be protected and the external circuit are interrupted.

In the normal-condition-OFF-type protection element, the temperature fuse may for example be configured by being provided with a minimum cross-sectional area of a terminal member between the second and the third terminals, and by laminating at least two types of metal materials having a composition in which a region including the minimum area is made into a eutectic alloy in a high temperature range.

In this case, for example, the terminal member of the temperature fuse is made of copper, and a periphery of the minimum cross-sectional area of the terminal member is configured with a silver pasting material.

Effect of the Invention

The present invention can provide a normal-condition-OFF-type protection element that protects a circuit to be protected including a driving circuit of a cooling fan motor from being damaged due to overheating without influencing an operation temperature even at a high current, and can shift to a safe temperature range, and provide a control unit having the normal-condition-OFF-type protection element.

BRIEF DESCRIPTION OF THE DRAWINGS

FIG. 1 is a block diagram illustrating a control unit for controlling driving of a cooling fan motor as an implementation example 1;

FIG. 2(a) is a perspective top view illustrating one example of a specific configuration of a normal-condition-OFF-type switch that configures a switching unit of a protection element of the control unit in the implementation example 1;

FIG. 2(b) is a side cross-sectional view of FIG. 2(a);

FIG. 4 is an exploded perspective view of the normal-condition-OFF-type switch illustrated in FIG. 3;

FIG. 7 is a block diagram of a control unit for controlling the driving of a cooling fan motor as an implementation example 4;

FIG. 9(a) is a perspective top view illustrating one example of a specific configuration of the normal-condition-OFF-type switch configuring a switching unit of a protection element of the control unit in the implementation example 4 or 5.

FIG. 9(b) is a side cross-sectional view of FIG. 9(a);

FIG. 10 is a block diagram simply illustrating a configuration of a conventional engine cooling electric fan control device;

FIG. 12 is a schematic illustrating a configuration implemented by changing of the manner in which a motor and a switching element are connected to a power supply and a ground in FIG. 5;

FIG. 14 is a schematic illustrating a configuration implemented by changing the manner in which a motor and a switching element are connected to a power supply and a ground in FIG. 7.

BEST MODE OF CARRYING OUT THE INVENTION

Figure 3:
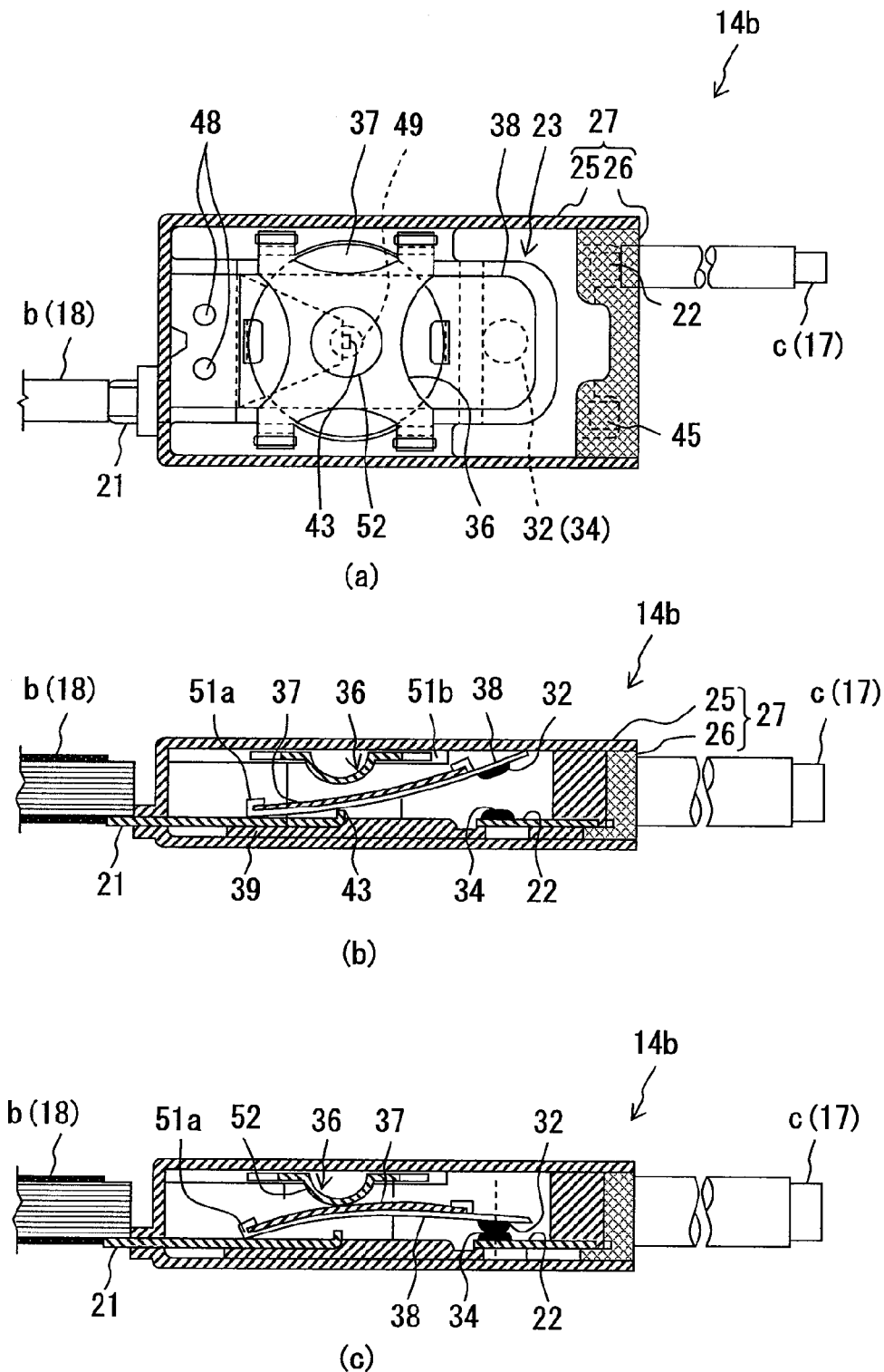
FIG. 3(a) is a perspective top view illustrating another example of the specific configuration of the normal-condition-OFF-type switch configuring the switching unit of the protection element of the control unit in implementation example 1.
FIG. 3(b) is a cross-sectional view of FIG. 3(a) at a normal temperature.
FIG. 3(c) is a cross-sectional view of FIG. 3(a) at an anomalous temperature.

Embodiments according to the present invention are described in detail below with reference to the drawings.

Implementation Example 1

FIG. 1 is a block diagram illustrating a control unit for controlling driving of a cooling fan motor in an implementation example 1. The control unit 10 illustrated in FIG. 1 is a control unit for controlling the driving of a motor 11 that revolves and drives a heat exchanger cooling fan (not illustrated) of, for example, an engine cooling system mounted in an automobile as a cooling system using a cooling medium and a heat exchanger.

As illustrated in FIG. 1, the control unit 10 includes a switching element 12 for controlling the driving of the motor 11, a controller 13 for transmitting a control signal to the switching element 12, and a normal-condition-OFF-type protection element 14 (simply referred to as a protection element 14 hereinafter).

The control unit 10 further includes a positive pole terminal 16 connected to a positive pole wire of a power supply 15, a ground terminal 17 connected to a negative pole wire (ground wire) of the power supply 15, a driving control terminal 18 connected to a negative pole side of the motor 11, and a signal input terminal 19 for receiving an external control signal.

Power is supplied to the controller 13 connected to the positive pole terminal 16 and the ground terminal 17, and the controller 13 outputs a driving signal for the motor 11 to the switching element 12 on the basis of a control signal externally input via the signal input terminal 19, or on the basis of control information programmed in the controller 13.

The switching element 12, connected between the signal output terminal 18 (load-side wire b) and the ground terminal 17 (ground-side wire c), opens/closes an internal switch (not illustrated) at predetermined cycles on the basis of a control signal from the controller 13, thereby controlling a driving current which is supplied from the power supply 15 to the motor 11 and flows back from the driving control terminal 18, to control the number of revolutions of the motor 11.

The protection element 14 has a first terminal 21 and a second terminal 22. The first terminal 21 is connected to wire b (the wire between the motor 11 and the switching element 12) of wires a and b connected to the positive and the negative poles connected from the power supply 15 to the motor 11. The second terminal 22 is directly connected to the ground wire c without being connected to the positive pole side wire a, which is the other of the wires a and b of the positive and the negative poles.

In other words, the protection element 14 is connected in parallel to the switching element 12 with respect to the power feeding wires a (=b) and c of the power supply 15.

Additionally, the protection element 14 includes a switching unit 23 as a short-circuit means for short-circuiting the first terminal 21 and the second terminal 22 when an overheating caused by the switching element 12 rises to a predetermined temperature or higher.

With a mechanical configuration, which will be described later, of a movable contact 32 and a fixed contact 34, the movable contact 32 and the fixed contact 34 of the switching unit 23 are closed to short-circuit the first terminal 21 and the second terminal 22 when the overheating caused by the switching element 12 rises to the predetermined temperature or higher.

As described above, the protection element 14 is connected in parallel to the switching element 12 with respect to the power feeding path, whereby a current flowing into the switching element 12 is decreased by being branched to the protection element 14 side, and the control unit 10 is shifted to a temperature range safe from the overheating caused by the switching element 12 without stopping the cooling system 20.

FIG. 2(*a*) is a perspective top view illustrating one example of a specific configuration of the protection element having the normal-condition-OFF-type switch as the switching unit 23. FIG. 2(*b*) is a side cross-sectional view of FIG. 2(*a*). In FIGS. 2(*a*) and 2(*b*), components having the same functions as those of the configuration in the block diagram illustrated in FIG. 1 are denoted with the same reference numerals as those of FIG. 1.

As illustrated in FIGS. 2(*a*) and 2(*b*), the protection element 14 (hereinafter referred to as 14*a*) has a housing 27 composed of a box-shaped case 25, and an insulative filling material 26 for sealing an opening (the right end in these figures) of the case 25.

The housing 27 has the first terminal 1 that is illustrated in FIG. 1 and fixedly arranged by penetrating into the box-shaped case 25, and the second terminal 22 that is also illustrated in FIG. 1 and fixedly arranged by penetrating into the insulative filling material 26.

Here, FIGS. 2(*a*) and 2(*b*) show that the lead terminal b (18) connected to the first terminal 21 and the lead terminal c (17) connected to the second terminal 22 are respectively lead terminals to be connected to the signal output terminal (load-side wire b) and the ground terminal 17 (ground-side wire c) in FIG. 1.

The housing 27 illustrated in FIGS. 2(*a*) and 2(*b*) includes a bimetal 28 as a heat responsive element having a warp direction that is inverted at a predetermined temperature or higher, and a movable plate 29 as a conductive energization elastic member that moves up and down according to the inversion operation of the bimetal 28.

The bimetal 28 is an almost circular heat responsive element. One end of the bimetal 28 in an arbitrary diameter direction is supported by being inserted in a support part of an insulative member 31*a* fixedly arranged within the housing 27, and a lower portion of the other end is supported by touching a support part of an insulative member 31*b*. The bimetal 28 is arranged to be upwardly convex at a normal temperature, as illustrated in FIGS. 2(*a*) and 2(*b*).

The movable plate 29 is arranged above the bimetal 28 so that it faces the bimetal 28. One end of the movable plate 29 in the same direction as one end of the bimetal 28 is fixed within the housing 27 by being connected to the first terminal 21, and the movable contact 32 is installed by being welded onto a lower surface of the other end (the free end).

On the movable plate 29, a concave part 33 formed with a punch press or the like is formed at a position that faces approximately the center of the convex portion of the bimetal 28 between the one end fixed within the housing 27 and the free end. Moreover, at a facing position separate from the movable contact 32 of the movable plate 29, the fixed contact 34 connected to the second terminal 22 is fixed to the housing 27.

The state of the components illustrated in FIGS. 2(*a*) and 2(*b*) is a state under normal conditions, namely, at a normal temperature, and the bimetal 28 warps in an upwardly convex shape illustrated in FIG. 2. The concave part 33 of the movable plate 29 is downwardly convex, and approximately the center of the convex lower surface makes contact with approximately the center of the upwardly convex upper surface of the bimetal 28.

The above described one end of the movable plate 29 is fixed to the housing 27 so that the movable plate 29 becomes horizontal as in its original unrestrained arrangement. Therefore, a portion of the movable plate 29 which makes contact with the bimetal 28 illustrated in FIGS. 2(*a*) and 2(*b*) is pressed upward by the bimetal 28, and the movable plate 29 is pressed upward from the horizontal position as in the unrestrained arrangement. As described above, the bimetal 28 exerts force on the movable contact 32 to move it to the position separate from the fixed contact 34 via the movable plate 29 under normal conditions.

Here, the switching unit 23 as the short-circuit means illustrated in FIG. 1 is composed of the bimetal 28, the movable plate 29, the movable contact 32, and the fixed contact 34 in FIGS. 2(*a*) and 2(*b*). Namely, the movable contact 32 and the fixed contact 34 are open under normal conditions as described above.

Then, at an anomalous temperature or higher, the bimetal 28 inverts its warp shape. As a result, the upward force exerted on the movable plate 29 by the contact between the upper surface of the bimetal 28, which is so far convex, and the downwardly convex lower surface of the movable plate 29 is canceled, whereby the free end side of the movable plate 29, provided with the movable contact 32, moves downward to return to the horizontal position as in the original arrangement.

As a result, the movable contact 32 presses and makes contact with the fixed contact 34 to form a conductive path between the movable contact 32 and the fixed contact 34, so that the first terminal 21 and the second terminal 22 are short-circuited. In consequence, when the protection element 14*a* illustrated in FIGS. 2(*a*) and 2(*b*) is arranged as the protection element 14 at a predetermined position of the control unit 10 illustrated in FIG. 1, the function described with reference to FIG. 1 is realized.

Namely, in the configuration illustrated in FIGS. 2(*a*) and 2(*b*), the first terminal 21 and the second terminal 22 of the protection element 14*a* are short-circuited when the overheating caused by the switching element 12 rises to the predetermined temperature or higher, thereby realizing the function of decreasing the current flowing into the switching element 12, and of shifting the control unit 10 to a temperature range safe from the overheating caused by the switching element 12 without stopping the cooling system 20.

FIG. 3(*a*) is a perspective top view illustrating another example of the specific configuration of the normal-condition-OFF-type switch configuring the switching unit 23 of the protection element 14 of the control unit 10. FIG. 3(*b*) is its cross-sectional view at a normal temperature. FIG. 3(*c*) is a cross-sectional view at an anomalous temperature.

FIG. 4 is an exploded perspective view of the normal-condition-OFF-type switch illustrated in FIGS. 3(*a*), 3(*b*) and 3(*c*). In FIGS. 3(*a*), 3(*b*), 3(*c*) and 4, components having the same functions as those in the configurations of the block diagrams illustrated in FIGS. 1 and 2 are denoted with the same reference numerals as those of FIG. 1.

As illustrated in FIGS. 3(*a*), 3(*b*), 3(*c*) and 4, the protection element 14 (hereinafter referred to as 14*b*) has a housing 27 formed with a box-shaped case 25, and an insulative filling material 26 for sealing an opening (the right end in these figures) of the case 25.

The protection element 14*b* illustrated in FIGS. 3(*a*), 3(*b*) and 3(*c*) is completed by sealing the opening (the right end in these figures) of the case 25 with the insulative filling material 26 after integrating the internal components illustrated in FIG. 4 into one body as an internal unit, which is then inserted into the case 25.

Here, FIG. 4 is initially described. As shown from top to bottom in FIG. 4, the internal unit 35 is composed of a convex lower surface member 36 as a fixed member, a bimetal 37 as a heat responsive element, a conductive elastic plate member 38 as an energization elastic member, and an insulative fixing member 39 provided with the terminals.

The insulative fixing member 39 is composed of a member having a horizontal long U-shaped cross-section. In one of the ends in the longitudinal direction (the opening of the U shape in the lower left direction in FIG. 4) of the insulative fixing member 39, a first terminal member 41 formed with the externally protruding first terminal 21 is fixed by being inserted in the horizontal direction.

At a wide end on the first terminal 21 side of the first terminal member 41, two swaging protrusions 42 are formed. At a tapered end on the side opposite to the wide end, one stopper protrusion 43 is arranged so that its thin end is bent upward.

Additionally, at the other end (the upper right end in FIG. 4) in the longitudinal direction of the insulative fixing member 39, a second terminal member 44 formed with the externally protruding second terminal 22 is fixed by being inserted in the horizontal direction.

On the side opposite to the second terminal 22 of the second terminal member 44, a dummy terminal 45 having the same shape as the second terminal 22 is formed. In the shape illustrated in FIG. 3(a), the lead terminal c (17) is connected to the second terminal 22. However, even if the lead terminal c (17) is connected to the dummy terminal 45 alternatively, the function as the protection element 14b remains unchanged. Which terminal the lead terminal c (17) is connected to is arbitrary.

In the neighborhood of the inner end of the second terminal member 44, the fixed contact 34 is formed. An upper surface of the insulative fixing member 39 corresponding to the inside of the second terminal member 44 where the fixed contact 34 is formed is formed with a level difference higher than the horizontally U-shaped opening side.

On the upper surface of the level difference part, a total of four long holes 46 (46a, 46b, 46c and 46d), namely, the respective two holes, are formed on the upper surface of the low level difference parts separate on both sides of the opening side of the horizontal U shape of the insulative fixing member 39. Moreover, arc-shaped cutaway parts 47 (47a, 47b) are formed on inner wall surfaces between the two long holes 46a and 46b, and between the long holes 46c and 46d of the low level difference parts.

Two stopper holes 48 formed on the one end (the end in the lower left section of FIG. 4) in the longitudinal direction of the conductive elastic plate member 38 are respectively inserted into the above described two swaging protrusions 42 of the insulative fixing member 39 having the above described configuration, and swaged with the swaging protrusions 42, so that one end of the conductive elastic plate member 38 is fixed to the insulative fixing member 39.

The movable contact 32 is welded onto a lower surface of the other end (the end in the upper right direction of FIG. 4) in the longitudinal direction of the conductive elastic plate member 38. Moreover, a hole 49 into which the stopper protrusion 43 of the first terminal member 41 freely goes in and out is formed approximately at the center of the conductive elastic plate member 38, and nail parts 51 (51a, 51b) orientated toward the hole 49 are formed by being cut and bent at positions almost symmetrical with respect to the hole 49 in the longitudinal direction.

For the bimetal 37, its arbitrary opposing ends in radial direction are engaged with the two nail parts 51a and 51b of the conductive elastic plate member 38 in a state where the convex surface is orientated downward at a normal temperature, namely, in an upwardly concave state at the normal temperature, so that a movement of the conductive elastic plate member 38 in the longitudinal direction is restricted and the conductive elastic plate member 38 is upwardly warped by the engagement with the two nail parts 51a and 51b.

Additionally, the diameter orthogonal to the diameter that engages with the nail parts 51a and 51b of the bimetal 37 is arranged between the arc-shaped cutaway parts 47a and 47b formed on the inner wall surfaces of the low level difference parts on both sides of the horizontal U shape of the insulative fixing member 39. As a result, the bimetal 37 can freely move up and down, and a movement in the short direction from the conductive elastic plate member 38 is restricted.

In the assembled state so far, the end of the conductive elastic plate member 38 provided with the stopper holes 48 is fixed to the insulative fixing member 39, which is pressed to upwardly warp by the engagement with the bimetal 37. Therefore, the end provided with the movable contact 32 is lifted upward so that the movable contact 32 is kept at a position separate from the fixed contact 34 at a normal temperature.

In this state, the convex lower surface member 36 is installed on the insulative fixing member 39. On the convex lower surface member 36, a downwardly convex part 52 formed with a punch press or the like is formed at the center of the nearly square plate, and insertion parts 53 (53a, 53b, 53c, 53d) formed by being bent downward at a right angle to the body surface of the member are formed at the four corners of the square.

The convex lower surface member 36 is installed in the insulative fixing member 39 by respectively inserting the above described four insertion parts 53 (53a, 53b, 53c, 53d) into the four long holes (46a, 46b, 46c, 46d) of the insulative fixing member 39.

As a result, the assembly of the members of the internal unit 35 is completed. Thereafter, the lead terminal c (17) is connected to the second terminal 22, the internal unit 35 is inserted into the case 25 illustrated in FIGS. 3(a), 3(b) and 3(c), and the inside of the case is sealed by filling the opening of the case 25 with the insulative filling material 26 in a state in which the first terminal 21 externally protrudes from a pre-formed hole at the bottom of the case 25.

In this way, the protection element 14b illustrated in FIGS. 3(a), 3(b) and 3(c) is completed. In FIGS. 3(a), 3(b) and 3(c), portions needed for a description are denoted with the reference numerals of the components described with reference to FIG. 4.

As represented by the cross-sectional view at the normal temperature in FIG. 3(b), the bimetal 37 that engages with the two nail parts 51a and 51b of the conductive elastic plate member 38 is in an upwardly concave state in the protection element 14b at the normal temperature, whereby the conductive elastic plate member 38 is upwardly warped.

Additionally, the stopper protrusion 43 penetrates into the hole 49 of the conductive elastic plate member 38 and touches approximately the center of the convex surface of the bimetal 37 in this state, whereby force is exerted onto the conductive elastic plate member 38 having the end opposite to the end provided with the movable contact 32 and fixed on the side of the insulative fixing member 39 with the stopper holes 48 and the swaging protrusions 42, so that the side of the end provided with the movable contact 32 further warps upward away from the fixed contact 34 by using the stopper protrusion 43 as a fulcrum point. As a result, the movable contact 32 and the fixed contact 34 do not close when undergoing small vibrations.

When the environmental temperature of the protection element 14b rises to the predetermined anomalous temperature or higher, the warp direction of the bimetal 37 is inverted, and the bimetal 37 becomes upwardly convex as illustrated in FIG. 3(*c*). The convex part 52 of the convex lower surface member 36 touches approximately the center of the upper surface of the upwardly convex bimetal 37.

As a result, the force of the bimetal 37 that has been inverted in the warp direction is exerted on the end side provided with the movable contact 32 of the conductive elastic plate member 38 to make the movable contact 32 touch the fixed contact 34 according to the principle of leverage by using, as a fulcrum point, the contact point between the center of the upper surface of the bimetal 37 and the convex part 52 of the convex lower surface member 36, and by using, as an power point, the nail part 51*a* on the side where the conductive elastic plate member 38 is fixed.

In the configuration of this protection element 14*b*, the bimetal 37 further warps due to inversion not only with an increase in the environmental temperature but with an increase in the temperature of the conductive elastic plate member 38 through energization.

As a result, the bimetal 37 further increases the force derived from inversion to the conductive elastic plate member 38 by using, as a fulcrum point, the contact point with the convex part 52 of the convex lower surface member 36, and further increases the force for touching the fixed contact 34 by the movable contact 32 via the conductive elastic plate member 38.

As described above, in the other configuration example of this implementation example, in addition to the actions/effects in the above described examples, the bimetal 37 applies an additional pressing force in addition to the contact pressure of the conductive elastic plate member 38, thereby strengthening the contact pressure between the contacts.

Additionally, if Joule heat is excessively caused at the contact portion by an increase in the contact resistance at the contact portion, the bimetal 37 senses this temperature and is displaced in a direction that further strengthens its warp.

As a result, a wipe operation occurs at the contact portion of the contacts the same time the contact pressure is increased, so that the contact portion of the contacts shifts in a stable direction. Namely, according to the other configuration example, the protection element can be provided with a function of self-correcting a problem of the contact portion of the contacts.

Normally, the resistance of a semiconductor switching element such as the above described switching element 12 is reduced. However, the semiconductor switching element has a resistance value of several mΩ to 10 mΩ. In contrast, the protection element 14 according to this implementation example can be configured to have an internal resistance of approximately 1 mΩ, depending on the size.

Accordingly, the internal resistance when the protection element 14 according to this implementation example is turned on is one half or less of the internal resistance of the control unit 10 or the switching element 12. Moreover, this control unit 10 is a control unit that can create a current of 25 A or higher. These are similar in the following implementation examples 2 to 5.

When the protection element 14 is activated, the switching element 12 is practically short-circuited. However, the internal resistance of the protection element 12 is approximately 1 mΩ, whereas the internal resistance of the switching element 12, such as an FET (Field-Effect Transistor) or the like, is at least several times the internal resistance of the protection element. Accordingly, since a current flows according to an inverse of the ratio of these resistances, a higher current flows into the protection element 14 side having a low resistance, and the current of the switching element 12 decreases to a fraction or lower. Consequently, heat produced by a faulty component of the switching element 12 or the like decreases to a safe range.

As described above, a bypass circuit is formed with the protection element 14 by shorting the circuit with the protection element 14 having a lower internal resistance than the switching element 12, and most of the current is bypassed to the protection element 14 side, whereby the current flowing into a faulty component (the controller 13 or the switching element 12) is decreased, and the control unit can be shifted from a dangerous temperature range to a temperature range that is safe in design.

Additionally, a recovery temperature is set for the operation temperature of the bimetal 28 so that the bimetal 28 does not recover under a predetermined environment, whereby the bimetal 28 is permitted in practice to perform only one operation. As a result, the bimetal 28 can be prevented from restarting, when a current is flowing while the automobile is running, which is safer.

The protection element 14 in this implementation example is not energized under normal conditions. Therefore, the protection element 14 exerts no ill effects on normal operations. By installing the protection element as a safety measure, a high reliability can be maintained.

Additionally, with the activation of the protection element 14, PWM (Pulse Width Modulation) control for the motor 11 is short-circuited by the switching unit 23. As a result, the cooling system is continuously in an ON state, and the motor 11 revolves at a rated full speed. As described above, the fan motor does not stop, and accordingly, the cooling system is not stopped. Therefore, the configuration of this implementation example is vital as a safety measure of the cooling system of, for example, an engine of an automobile while it is running.

If the above described anomaly occurs, it is possible to notify an automobile driver of the faulty state with a display or the like. However, since the motor 11 (fan motor) continuously revolves at full speed, the driver can be made to easily notice an occurrence of an anomaly. Moreover, since the fan motor continuously revolves at full speed until the driving of the automobile is stopped, the cooling system can stop the function on a safe state.

As described above, according to the present invention, the protection element is configured to be of a normal-condition-OFF-type/anomalous-condition-short-circuit-type, whereby even a high current at a high temperature does not directly flow into the protection element under normal conditions. Therefore, the temperature is not increased by energization, namely, the activation temperature is not varied by a current, and stable operations at a proper operation temperature as set in the design can be performed.

Additionally, since the protection element is not inserted in the energization path of the body circuit of the cooling system, the original function of the circuit is not inhibited at the time of normal operations. Accordingly, a reliable design of the control unit can be more easily supported, and this is only the configuration of achieving both reliability and safety.

In the above described implementation example 1, an entire current does not normally flow into the protection element 14 when the protection element 14 is activated. Therefore, the temperature of the protection element 14 side does not significantly increase. However, if the motor 11 revolves at full speed and the temperature of a cooling medium drops to stop the energization of the control unit 56 or 59, or if the switching element 12 is opened, the entire current flows into the protection element 14.

In this case, the temperature rises with the long-duration energization of a high current, and accordingly, this causes a concern that the protection element 14 can be damaged. In such a case, the cooling system needs to be interrupted from the power supply. A configuration example of the control unit having such a function is described below as implementation examples 2 and 3.

Implementation Example 2

The control unit 10 having the protection element 14b including a self-correcting type switching unit in other configuration examples of the above described implementation example 1 can be configured by being provided with a function of welding the conductive path of the cooling system in order to avoid a possible danger of an overheating of the energization path of the protection element 14b (14a is similar) due to a further increase in the current, so that the cooling system is terminated when in the OFF state. This is described below as an implementation example 2.

Figure 5:
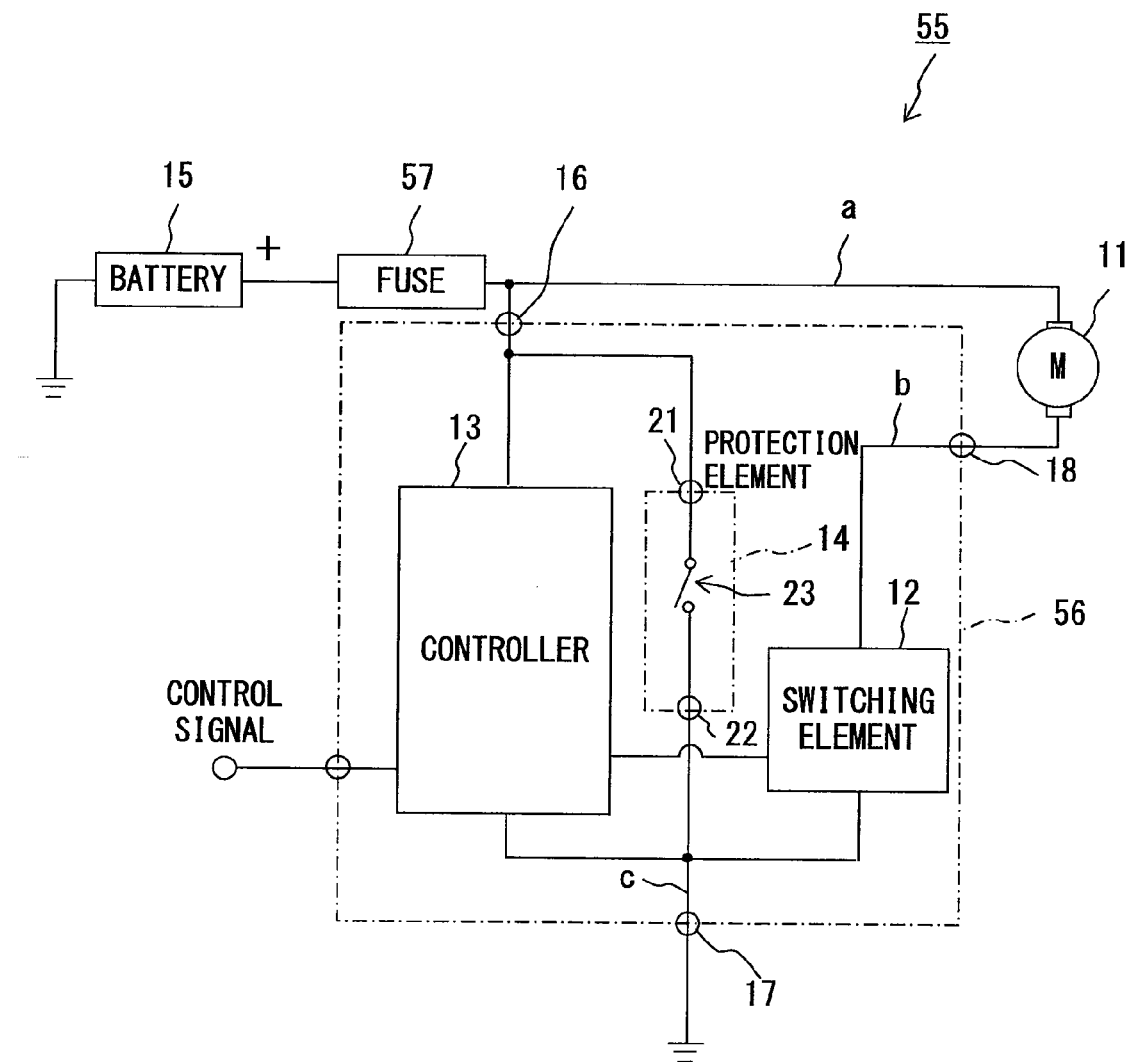
FIG. 5 is a block diagram illustrating a configuration of a cooling system as an implementation example 2.

FIG. 5 is a block diagram illustrating a configuration of the cooling system as the implementation example 2. In FIG. 5, the same components or functions as those illustrated in FIG. 1 are denoted with the same reference numerals as those of FIG. 1.

As illustrated in FIG. 5, in the cooling system 55 in this implementation example, the control unit 56 is different from the control unit 10 illustrated in FIG. 1 in that the first terminal 21 of the protection element 14 is connected to the positive pole side, on which power is fed from the positive pole terminal 16 to the controller, of the wires of the positive and the negative poles connected from the power supply 15 to the control unit 56.

Additionally, externally to the control unit 56, a fuse 57 is arranged as an overcurrent interrupt element interposed between the positive pole terminal 16 and the power supply 15.

In the configuration of the cooling system 55 illustrated in FIG. 5, as described with reference to FIGS. 1 to 4, the switching unit 23 as a short-circuit means of the protection element 14 (14a or 14b) internally short-circuits a first terminal 32 and a second terminal 34 (see FIG. 2 or FIGS. 3(a), 3(b) and 3(c)) when an overheating caused by an anomaly in the internal element (the controller 13, the switching element 12 or the like) of the control unit 56 occurs.

As a result, the fuse 57 connected in series between the positive pole terminal 16 of the control unit 56, to which the first terminal 21 of the protection element 14 is connected, and the power supply 15, responds to the current flowing into the short-circuit of the protection element 14, and interrupts all current paths from the power supply 15 to all the circuits on the positive pole side, so that the entire cooling system is stopped.

As described above, in the normal-condition-OFF-type protection element as in this implementation example, the fuse 57 is arranged as external interrupt means, which is operated by force, whereby the circuit can be kept protected.

Implementation Example 3

In the above described implementation example 2, the fuse 57 as an overcurrent interrupt element is arranged externally to the control unit 56. However, similar effects can also be achieved if the fuse is arranged inside the control unit. This is described below as an implementation example 3.

Figure 6:
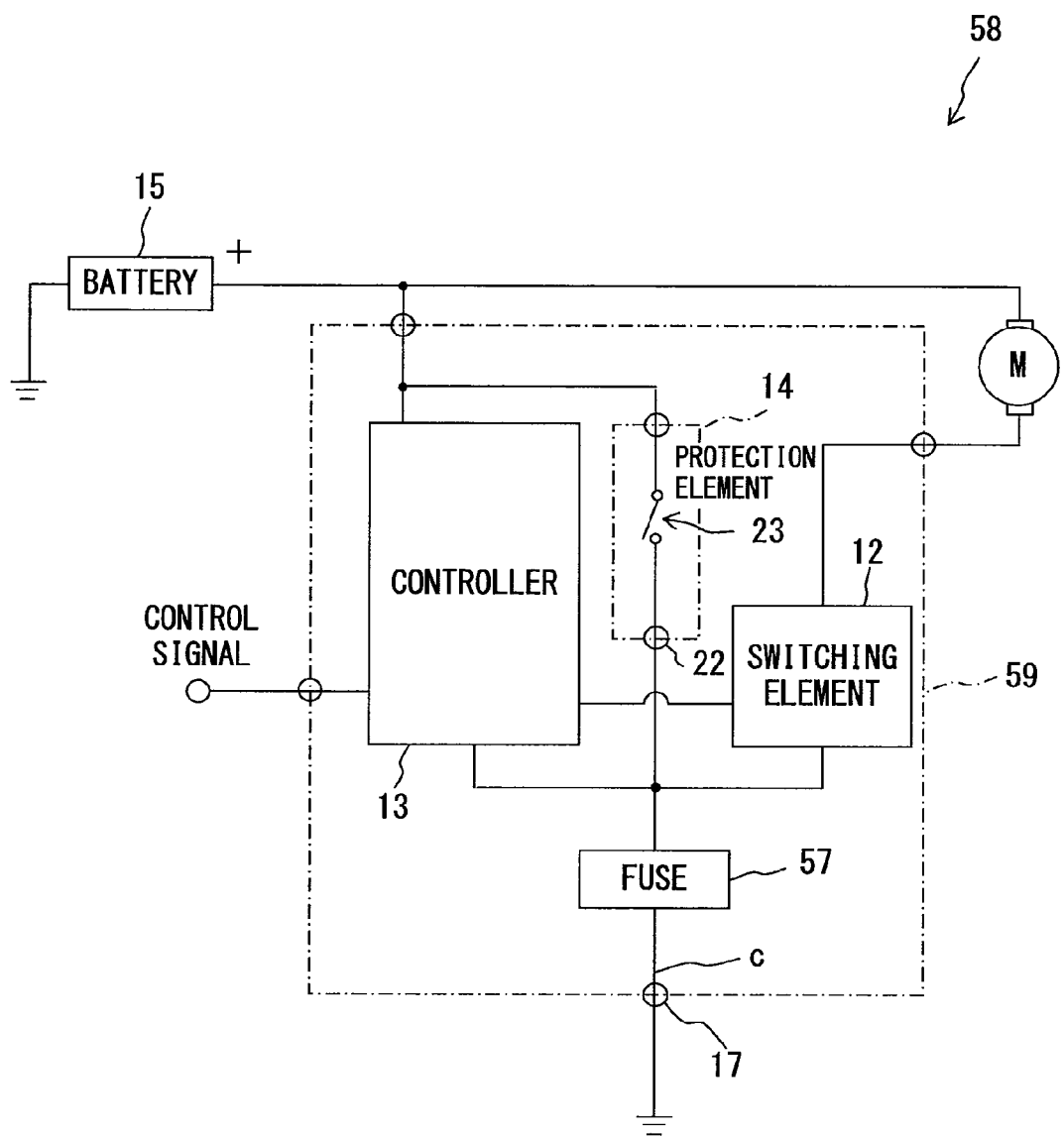
FIG. 6 is a block diagram illustrating a configuration of a cooling system and a control unit as an implementation example 3.

FIG. 6 is a block diagram illustrating a configuration of a cooling system and a control unit as the implementation example 3. The entire configuration of the cooling system 58 illustrated in FIG. 6 is the same as that of the cooling system 55 illustrated in FIG. 5 except for the arrangement position of the fuse 57. Therefore, only components needed for a description are denoted with the same reference numerals as those of FIG. 5.

As illustrated in FIG. 6, the cooling system 58 in this implementation example is different from the cooling system 55 illustrated in FIG. 5 in that the fuse 57 is connected between the second terminal 22 of the protection element 14 and the ground terminal 17 (ground-side wire c).

In the configuration of this cooling system 58 illustrated in FIG. 6, as described with reference to FIGS. 1 to 4, the switching unit 23 as short-circuit means of the protection element 14 (14a or 14b) internally short-circuits the first terminal 32 and the second terminal 34 (see FIG. 2 or FIGS. 3(a), 3(b) and 3(c)) when an overheating caused by an anomaly in the internal element (the controller 13, the switching element 12 or the like) of the control unit 59 occurs.

As a result, the fuse 57 connected between the second terminal 22 of the protection element 14 and the ground terminal 17 (ground-side wire c) inside the control unit 59 responds to a current flowing in the shorted circuit of the protection element 14 to interrupt a current path to which power is fed from the power supply 15 and which is unified from all circuits on the ground side, and the entire cooling system 58 is stopped.

In the above described implementation example 2 or 3, the fuse 57 may be a current fuse, or a current interrupt device of an operating type, such as a relay or the like, may be used.

Implementation Example 4

FIG. 7 is a block diagram of a control unit for controlling the driving of a cooling fan motor as an implementation example 4. In the configuration of the cooling system 60 illustrated in FIG. 7, the same components as those of the configuration of the cooling system 20 illustrated in FIG. 1 are denoted with the same reference numerals as those of FIG. 1.

In the cooling system 60 illustrated in FIG. 7, the configuration of the protection element 62 of the control unit 61 is different from the protection element 14 of the control unit 10 of the cooling system 20 illustrated in FIG. 1. Functions/actions of the configuration other than this different portion are similar to those of the case illustrated in FIG. 1. Therefore, explanations of them are omitted here.

The protection element 62 illustrated in FIG. 7 has a third terminal 63 in addition to the first terminal 21 and the second terminal 22.

The protection element 62 is similar to the case of FIG. 1 in that the first terminal 21 is connected to one wire b (the wire connecting the motor 11 and the switching element 12) of the wires a and b of the positive and the negative poles connecting from the power supply 15 to the motor 11, and in that the second terminal 22 is connected to a ground-side wire d of the controller 13 and the switching element 12.

Additionally, the protection element 62 is similar to the case of FIG. 1 in that the second terminal 22 is connected to the fixed contact 34 of the switching unit 23. In this implementation example, however, the second terminal 22 is further connected to the third terminal 63 via a fuse 64 as an overcurrent interrupt element along with the fixed contact 34, and the third terminal 63 is directly connected to the ground wire c. In other words, the ground side of the controller 13 and the switching element 12 is connected to the ground wire c via the second terminal 22, the fuse 64, and the third terminal 63.

When an overheating caused by an anomaly in the internal element (the controller 13, the switching element 21 or the like) occurs in this control unit 61, the movable contact 32 and the fixed contact 34 in the switching unit 23 of the protection element 62 are closed to short-circuit between the first terminal 21 and the second terminal 22, a current flowing into the controller 13, the switching element 12 or the like is decreased to suppress the overheating of the control unit 61, and the control unit 61 is attempted to be shifted to a safe temperature range.

However, if a tolerance value is exceeded by heat produced by the current, the protection element 62 melts the fuse 64 between the second terminal 22 and the third terminal 63. As a result, the control unit 61 is interrupted from the power supply 15 by interrupting the current between the second terminal 22 and the third terminal 63, and the control unit 61 is shifted to the safe temperature range. At this time, the operations of the cooling system 60 are also stopped.

Implementation Example 5

Figure 8:
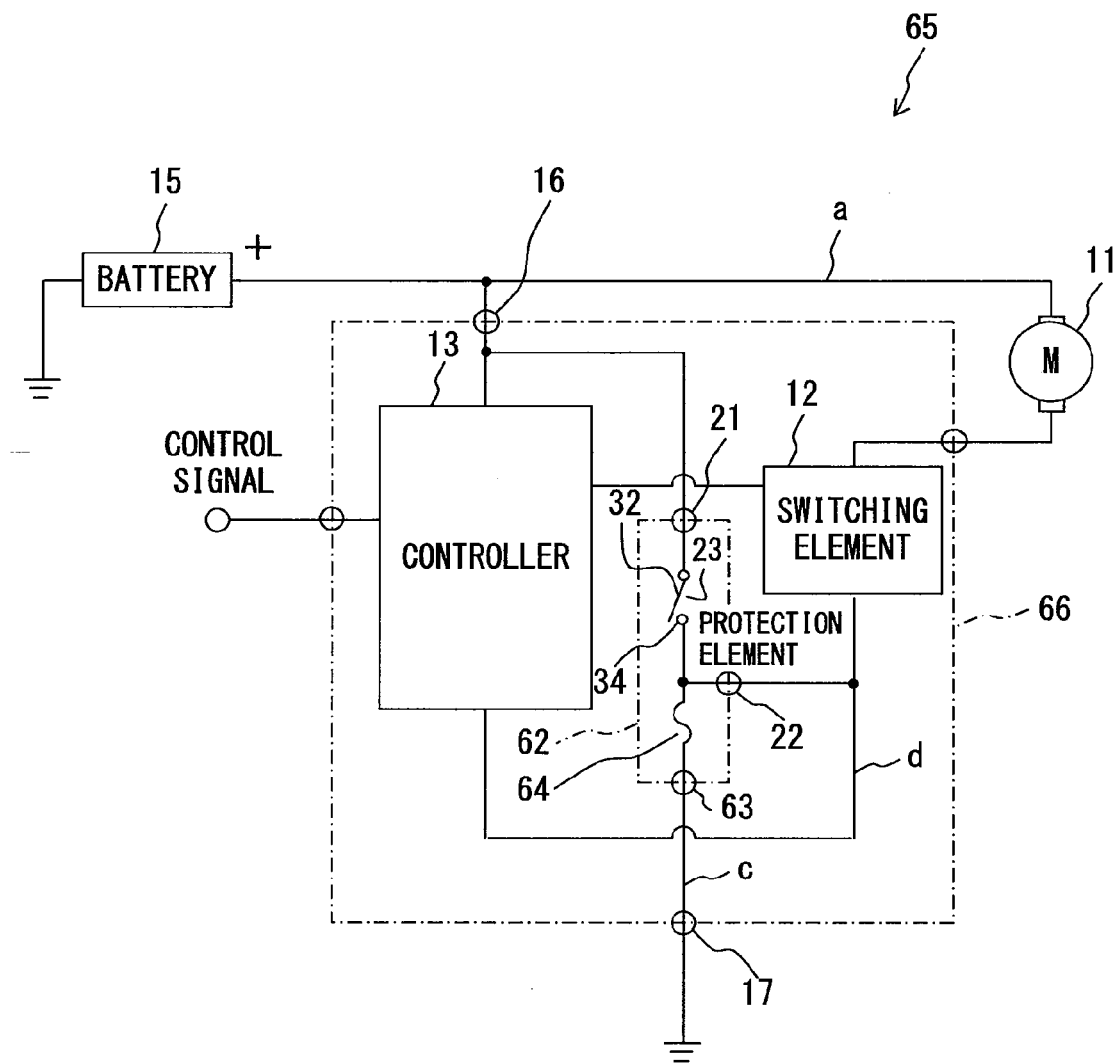
FIG. 8 is a block diagram of a control unit for controlling the driving of a cooling fan motor as an implementation example 5.

FIG. 8 is a block diagram of a control unit for controlling the driving of a cooling fan motor as an implementation example 5. In the configuration of the cooling system 65 illustrated in FIG. 8, the same components as those in the configuration of the cooling system 60 illustrated in FIG. 7 are denoted with the same reference numerals as those of FIG. 7.

In the cooling system 65 illustrated in FIG. 8, a method for connecting the protection element 62 of the control unit 66 to another component is different from that in the case of FIG. 7. Functions and actions of the configuration other than this different portion are similar to those in the case of FIG. 7. Therefore, explanations of them are omitted here.

In the protection element 62 illustrated in FIG. 8, the connection position of the first terminal 21 is different from that in the case of FIG. 7. Namely, in FIG. 8, the first terminal 21 of the protection element 62 is connected to the positive pole side, at which power is fed from the positive pole terminal 16 to the controller 13, of the wires of the positive and the negative poles connected from the power supply 15 to the control unit 66.

Also in this implementation example, when an overheating caused by an anomaly in the internal element (the controller 13, the switching element 21 or the like) occurs in this control unit 66, the movable contact 32 and the fixed contact 34 in the switching unit 23 of the protection element 62 are closed to short-circuit between the first terminal 21 and the second terminal 22, a current flowing into the controller 13, the switching element 12 or the like is decreased to suppress the overheating of the control unit 61, and the control unit is attempted to be shifted to the safe temperature range.

However, if a tolerance value is exceeded by heat produced by the current, the protection element 62 melts the fuse 64 between the second terminal 22 and the third terminal 63. As a result, the control unit 61 is interrupted from the power supply 15 by interrupting the current between the second terminal 22 and the third terminal 63, and the control unit 61 is shifted to the safe temperature range. At this time, the operations of the cooling system 60 are also stopped.

FIG. 9(*a*) is a perspective top view illustrating one example of a specific configuration of the protection element having the normal-condition-OFF-type switch as the switching unit 23 in the above described implementation examples 4 and 5. FIG. 9(*b*) is its side cross-sectional view.

In FIGS. 9(*a*) and 9(*b*), only components needed for a description provided here from among the components having the same functions as those of the configurations of the block diagrams illustrated in FIGS. 7 and 8 are denoted, and are given the same reference numerals as those of FIGS. 7 and 8, and explanations other than the needed explanations are omitted.

Additionally, the configuration illustrated in FIGS. 9(*a*) and 9(*b*) is basically a configuration implemented by newly providing the third terminal 63 communicated via the first terminal 21 and an overcurrent melting unit 67 in the configuration illustrated in FIG. 2. Accordingly, only components needed for the description provided here from among the same functions and components as those of the configuration illustrated in FIG. 2 are denoted with the same reference numerals as those of FIG. 2, and explanations other than the needed explanations are omitted.

In the configuration of the protection element 62 of this implementation example illustrated in FIGS. 9(*a*) and 9(*b*), connecting a dedicated temperature fuse member between the first and the third terminals as the overcurrent melting unit 67 that configures the temperature fuse increases not only the size of the configuration but the degree of difficulty of an embedding technique.

Accordingly, in the overcurrent melting unit 67 in this implementation example, part of a cross-sectional area of the terminal member 68 that links the first terminal 21 and the third terminal 63 is formed to be the minimum needed to melt at a high temperature as easily as possible.

However, for a protection element into which a current as high as 25 A flows as in this implementation example, copper needs to be used for a terminal member in order to reduce the resistance of a current path. However, the melting point needs to be lowered because the melting point of copper is as high as 1083° C.

To lower the melting point, it is preferable to configure the protection element by laminating at least two types of metal materials having a composition made into a eutectic alloy at a high temperature range. Specifically, since copper needs to be used for the terminal member as described above, silver 69 having a melting point of 960° C. is pasted onto the periphery of the minimum cross-sectional area of the terminal member 68 made of copper.

As a result, diffusion on an interface between copper and silver in the high temperature range proceeds, and a eutectic organization grows, whereby it was experimentally proved that the melting point drops to 780° C.

Moreover, both copper and silver are materials with high conductivity (IACS %). Namely, copper is 100%, whereas silver is 105%. However, the conductivity of a eutectic composition (silver 72%, copper 28%) drops to 77%.

Accordingly, in the overcurrent melting unit 67, the minimum cross-sectional area is set, and settings are made such that a high temperature portion quickly increases inherent resistance due to the above described diffusion reaction and eutectic organization growth and results in melting in a situation in which an environmental temperature is approximately 200° C. under an anomalous condition and a high current of approximately 30 A to 50 A flows, and the functions of the control unit 61 or 66 illustrated in FIG. 7 or 8 can be implemented.

In the above described implementation examples 1 to 5, the protection element activated by an anomaly in the internal element of the control unit can be configured so that a recovery is restricted according to a temperature of an energized portion after operations by setting the recovery temperature of the bimetal to a predetermined environmental temperature or lower.

In this case, depending on a temperature set to the environmental temperature or lower, the protection element can be set so that it operates only once under an expected environment.

In the above described implementation examples, the positive pole side of the motor is directly connected to the positive pole side of the power supply, and the negative pole side of the motor is connected to the ground side via the switching element in the circuit configuration of the control unit. However, as a matter of course, the positive pole side of the motor may be connected to the power supply via the switching element, and the negative pole side of the motor may be directly connected to the ground side.

Figure 11:
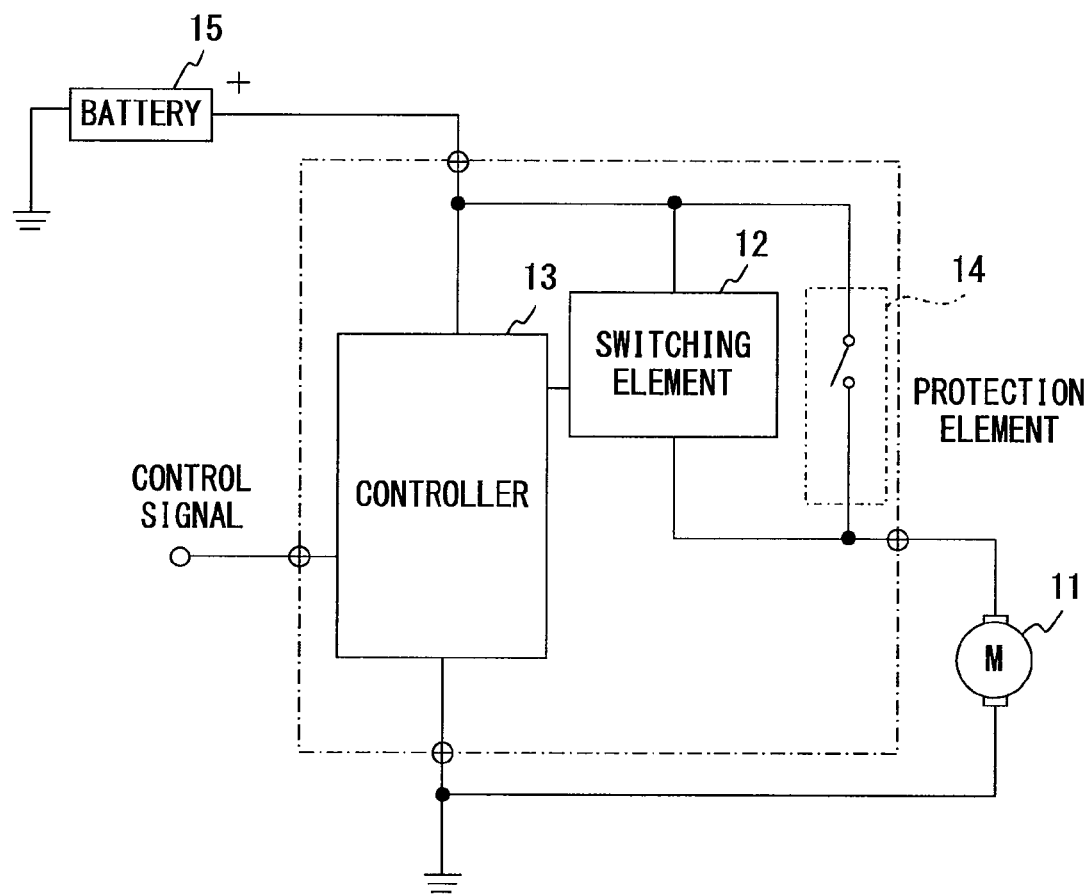
FIG. 11 is a schematic illustrating a configuration implemented by changing the manner in which a motor and a switching element are connected to a power supply and a ground in FIG. 1.
Figure 13:
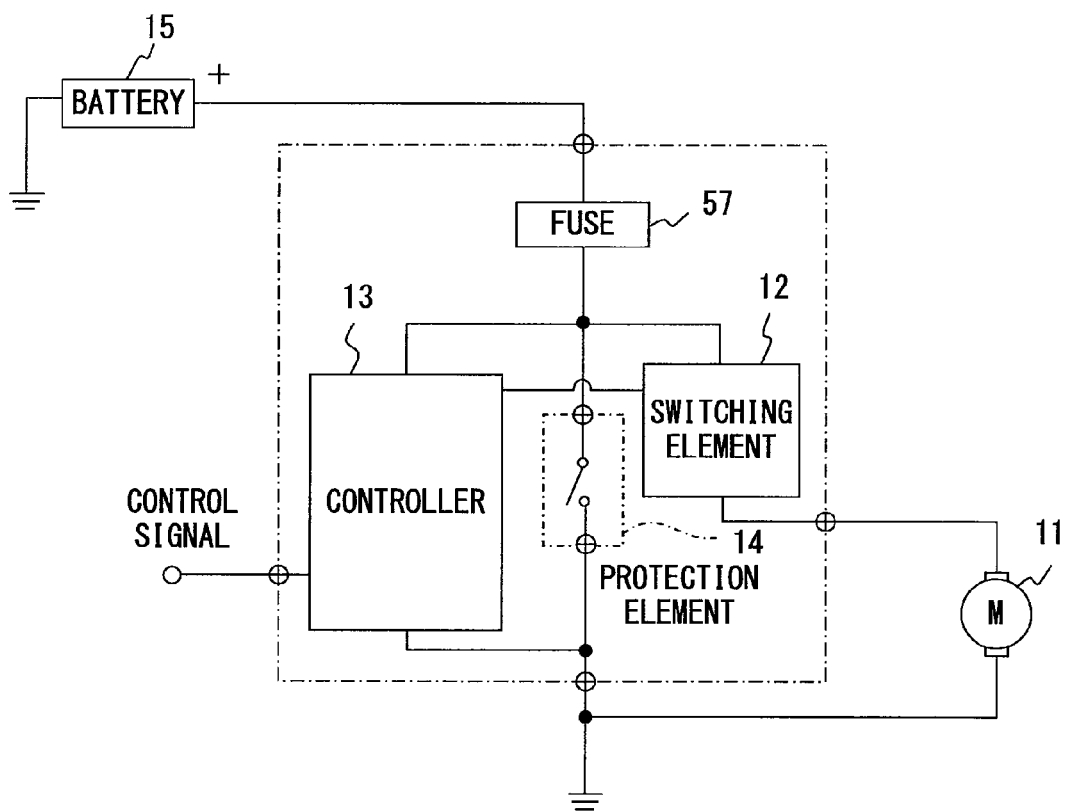
FIG. 13 is a schematic illustrating a configuration implemented by changing the manner in which a motor and a switching element are connected to a power supply and a ground in FIG. 6.
Figure 15:
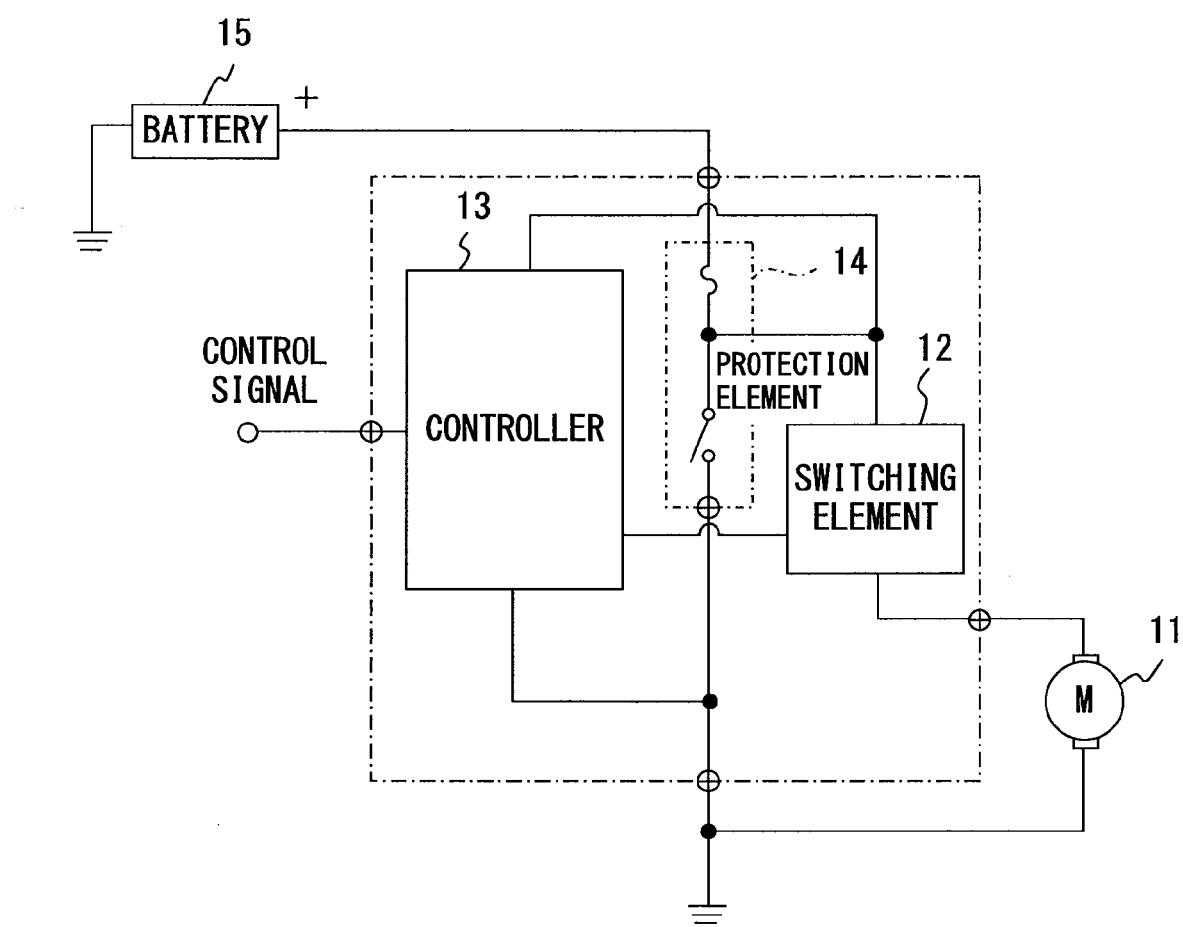
FIG. 15 is a schematic illustrating a configuration implemented by changing the manner in which a motor and a switching element are connected to a power supply and a ground in FIG. 8.

Configurations implemented by changing the manner of connecting the motor and the switching element to the power supply and the ground are specifically represented in FIGS. 11 to 15. FIG. 11 is a schematic of a change corresponding to FIG. 1, FIG. 12 is a schematic of a change corresponding to FIG. 5, FIG. 13 is a schematic of a change corresponding to FIG. 6, FIG. 14 is a schematic of a change corresponding to FIG. 7, and FIG. 15 is a schematic of a change corresponding to FIG. 8.

INDUSTRIAL APPLICABILITY

The present invention is applicable to a control unit having a protection element that is an OFF type under normal conditions and that protects a circuit to be protected from being damaged due to overheating with a closing of contacts at an anomalous temperature.

EXPLANATION OF CODES 1 power supply battery
2 motor
3 motor control device (engine cooling electric fan control device)
4 controller
5 switching element
6 control signal
10 control unit
11 motor
12 switching element
13 controller
14 (14a, 14b) normal-condition-OFF-type protection element (protection element)
15 power supply
16 positive pole terminal
17 ground terminal
18 driving control terminal
19 signal input terminal
20 cooling system
21 first terminal
22 second terminal
23 switching unit
25 box-shaped case
26 insulative filling material
27 housing
28 bimetal
29 movable plate
31a, 31b insulative member
32 movable contact
33 concave part
34 fixed contact
26 insulative filling material
27 housing
35 internal unit
36 convex lower surface member
37 bimetal
38 conductive elastic plate member
39 insulative fixing member
41 first terminal member
42 swaging protrusion
43 stopper protrusion
44 second terminal member
45 dummy terminal
46 (46a, 46b, 46c, 46d) long holes
47 (47a, 47b) arc-shaped cutaway parts
48 stopper hole
49 hole
51 (51a, 51b) nail parts
52 convex part
53 (53a, 53b, 53c, 53d) insertion parts
55 cooling system
56 control unit
57 fuse
58 cooling system
59 control unit
60 cooling system
61 control unit
62 protection element
63 third terminal
64 fuse
65 cooling system
66 control unit
67 overcurrent melting unit
68 terminal member
69 silver

What is claimed is:

1. A control unit for controlling driving of a motor that revolves and drives a heat exchanger cooling fan of a cooling system using a cooling medium and a heat exchanger, the control unit including at least a switching element for controlling the driving of the motor, and a controller for transmitting a control signal to the switching element, the control unit comprising:

a normal-condition-OFF-type protection element having a first terminal connected to one of two wires connected respectively to a positive and a negative pole connected to the motor, and a second terminal directly connected to a ground wire without being connected to the other of the wires connected to the positive and the negative poles; and short-circuit means, arranged inside the normal-condition-OFF-type protection element, for short-circuiting the first terminal and the second terminal when an overheating caused by the switching element attains a predetermined temperature or higher, wherein the short-circuit means short-circuits the first terminal and the second terminal when the overheating caused by the switching element attains the predetermined temperature or higher, whereby an electric current flowing into the switching element is decreased, and the control unit is shifted to a temperature range safe from the overheating caused by the switching element without stopping the cooling system.

2. The control unit having the normal-condition-OFF-type protection element according to claim 1, wherein
the first terminal is connected to a load-side wire of the switching element, and
the second terminal is connected to a ground-side wire of the switching element.

3. The control unit having the normal-condition-OFF-type protection element according to claim 1, wherein the short-circuit means comprises a heat responsive element that inverts a warp direction at a predetermined temperature or higher, and an energization elastic member that separates a movable contact, provided on a free end side, from a fixed contact, fixedly arranged within a housing of a body device of the normal-condition-OFF-type protection element, according to an inversion operation of the heat responsive element, the first terminal is a terminal linked to the movable contact, the second terminal is a terminal linked to the fixed contact, and the heat responsive element exerts force on the movable contact to move it to a position separate from the fixed contact via the energization elastic member by using a warp shape at a normal temperature in a normal temperature range, and the heat responsive element cancels the force on the energization elastic member by inverting the warp shape at an anomalous temperature or higher to make the movable contact touch the fixed contact using elasticity of the energization elastic member.

4. The control unit having the normal-condition-OFF-type protection element according to claim 1, wherein:

the short-circuit means comprises a heat responsive element that inverts a warp direction at a predetermined temperature or higher, an energization elastic member that engages with both ends of the heat responsive element, warps according to an inversion operation of the heat responsive element, and has one end fixed inside a housing of a body device of the normal-condition-OFF-type protection element in order to be connected to the one wire and the other end provided with the movable contact, and a fixing member touching approximately a center of a convex part that becomes convex by warping with an inversion of the heat responsive element when the heat responsive element inverts the warp direction at a predetermined temperature or higher; and the heat responsive element exerts force on the movable contact to move it to a position separate from the fixed contact via the energization elastic member according to a warp shape at the normal temperature in a normal temperature range, the heat responsive element causes the movable contact to touch the fixed contact by exerting force on the energization elastic member in a direction opposite to a direction force is exerted at the normal temperature by inverting the warp shape at an anomalous temperature or higher, and the heat responsive element further warps due to the inversion according to an increase in a temperature of the energization elastic member, exerts additional force on the energization elastic member according to the warp by using a point touching the fixed member as a fulcrum point, and exerts additional force for touching the fixed contact by the movable contact with the energization elastic member.

5. The control unit having the normal-condition-OFF-type protection element according to claim 1, wherein the first terminal is connected to a positive pole side of the wires of the positive and the negative poles, when an overheating caused by an anomaly in an internal element of the control unit occurs, the short-circuit means internally short-circuits the first terminal and the second terminal to activate an overcurrent interrupt element provided externally to the control unit, and stops the cooling system.

6. The control unit having the normal-condition-OFF-type protection element according to claim 1, wherein the first terminal is connected to a positive pole side of the wires of the positive and the negative poles, the second terminal is connected to the ground wire via an overcurrent interrupt element provided inside the control unit, and when an overheating caused by an anomaly in an internal element of the control unit occurs, the short-circuit means internally short-circuits the first terminal and the second terminal to activate the overcurrent interrupt element, and stops the cooling system.

7. The control unit having the normal-condition-OFF-type protection element according to claim 1, wherein the switching element comprises an FET (Field Effect Transistor), the first terminal is a drain terminal, and the second terminal is a source terminal.

8. The control unit having the normal-condition-OFF-type protection element according to claim 1, wherein the control unit is a control unit to which an electric current of 25 A or higher is sent, and an internal resistance of the normal-condition-OFF-type protection element when ON is one half or less of an internal resistance of the control unit or the switching element.

9. A control unit for controlling driving of a motor that revolves and drives a heat exchanger cooling fan of a cooling system, the control unit including at least a switching element for controlling the driving of the motor, and a controller for transmitting a control signal to the switching element, the control unit comprising:

a protection element having a first terminal connected to one of both contacts that are open under normal conditions, and a wire connecting the motor and the switching element, a second terminal connected to the other of the contacts and a ground-side wire of the switching element and the controller, and a third terminal connected between the second terminal and a ground terminal of the control unit via an overcurrent interrupt element, wherein when an overheating caused by an anomaly in an internal element occurs, the overheating of the control unit is suppressed by decreasing an electric current flowing into the switching element via short-circuiting between the first terminal and the second terminal, and if a tolerance value is exceeded by heat produced by the electric current, the protection element interrupts between the second terminal and the third terminal to interrupt the control unit from a power supply, and shifts the control unit to a safe temperature range.

10. The control unit having the normal-condition-OFF-type protection element according to claim 9, wherein the first terminal is connected to a positive pole side wire of the controller, when the overheating caused by the anomaly in the internal element occurs, the protection element short-circuits between the first terminal and the second terminal to decrease an electric current flowing into the controller and the switching element, and suppresses the overheating of the control unit, and if a tolerance value is exceeded by heat produced by the electric current, the protection element interrupts between the second terminal and the third terminal to interrupt the control unit from the power supply, and shifts the control unit to the safe temperature range.

11. A normal-condition-OFF-type protection element recognizing a control circuit for driving and controlling an external circuit as a circuit to be protected, comprising:
   a first terminal, connected to a contact within the element, extending externally to the element in order to be connected to one of two wires connected respectively to a positive and a negative pole of the circuit to be protected;
   a second terminal, connected to the other of the contacts within the element, extending externally to the element in order to be connected to the other of the wires of the positive and the negative poles;
   a third terminal to be connected to a ground wire externally to the element; and
   a temperature fuse, arranged between the second terminal and the third terminal, melting down at a predetermined temperature or higher, wherein
   the normal-condition-OFF-type protection element becomes a normal-condition-OFF-type by opening the contacts under normal conditions, and protects the circuit to be protected from being damaged due to overheating via a branch of an electric current of the circuit to be protected between the first contact and the second contact by closing the contacts at an anomalous temperature,
   if the anomalous temperature further increases to the predetermined temperature or higher, the temperature fuse melts to interrupt a current path between the first and the second contacts and the third contact, so that electric currents of the circuit to be protected and the external circuit are interrupted.

12. The normal-condition-OFF-type protection element according to claim 11, wherein
   the temperature fuse is configured by being provided with a minimum cross-sectional area of a terminal member between the second and the third terminals, and by laminating at least two types of metal materials having a composition of making a region including the minimum area into a eutectic alloy in a high temperature range.

13. The normal-condition-OFF-type protection element according to claim 12, wherein
   the terminal member of the temperature fuse is made of copper, and
   a periphery of the minimum cross-sectional area of the terminal member is configured with a silver pasting material.

14. The control unit having the normal-condition-OFF-type protection element according to claim 5, wherein
   the switching element comprises an FET (Field Effect Transistor),
   the first terminal is a drain terminal, and
   the second terminal is a source terminal.

15. The control unit having the normal-condition-OFF-type protection element according to claim 6, wherein
   the switching element comprises an FET (Field Effect Transistor),
   the first terminal is a drain terminal, and
   the second terminal is a source terminal.

16. The control unit having the normal-condition-OFF-type protection element according to claim 5, wherein
   the control unit is a control unit to which an electric current of 25 A or higher is sent, and
   an internal resistance of the normal-condition-OFF-type protection element when ON is one half or less of an internal resistance of the control unit or the switching element.

17. The control unit having the normal-condition-OFF-type protection element according to claim 6, wherein
   the control unit is a control unit to which an electric current of 25 A or higher is sent, and
   an internal resistance of the normal-condition-OFF-type protection element when ON is one half or less of an internal resistance of the control unit or the switching element.

* * * * *

UNITED STATES PATENT AND TRADEMARK OFFICE
CERTIFICATE OF CORRECTION

PATENT NO.        : 8,384,334 B2
APPLICATION NO.   : 13/063913
DATED             : February 26, 2013
INVENTOR(S)       : Hideaki Takeda It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 138 days.

Signed and Sealed this
First Day of September, 2015

Michelle K. Lee
*Director of the United States Patent and Trademark Office*